United States Patent [19]

Stilger et al.

[11] Patent Number: 5,320,518

[45] Date of Patent: Jun. 14, 1994

[54] METHOD AND APPARATUS FOR RECUPERATIVE HEATING OF REACTANTS IN AN REACTION MATRIX

[75] Inventors: John D. Stilger; Richard J. Martin, both of San Jose; Mark R. Holst, Concord, all of Calif.

[73] Assignee: Thermatrix, Inc., San Jose, Calif.

[21] Appl. No.: 945,218

[22] Filed: Sep. 15, 1992

Related U.S. Application Data

[63] Continuation-in-part of Ser. No. 871,679, Apr. 20, 1992, abandoned, which is a continuation-in-part of Ser. No. 726,060, Jul. 5, 1991, Pat. No. 5,165,884.

[51] Int. Cl.$^5$ ............................................. F23D 3/40
[52] U.S. Cl. ...................................... 431/7; 431/170; 122/4 D
[58] Field of Search ................. 431/7, 170; 122/4 D

[56] References Cited

U.S. PATENT DOCUMENTS

| | | | |
|---|---|---|---|
| 1,812,341 | 6/1931 | Jaeger | 122/4 D |
| 2,439,836 | 1/1949 | Murphree | 122/4 D |
| 2,795,054 | 6/1957 | Bowen, III | 34/35 |
| 2,976,853 | 3/1961 | Hunter et al. | 431/170 |
| 3,661,497 | 5/1972 | Castelluci et al. | 431/7 |
| 3,723,919 | 5/1973 | Wilson | 165/110 |
| 3,769,922 | 11/1973 | Furlong et al. | 110/28 |
| 3,807,090 | 4/1974 | Moss | 48/128 |
| 3,810,732 | 5/1974 | Koch | 431/7 |
| 3,888,193 | 6/1975 | Kishigami et al. | 110/8 |
| 3,900,554 | 8/1975 | Lyon | 423/235 |
| 3,942,264 | 3/1976 | Zenkner | 34/35 |

(List continued on next page.)

OTHER PUBLICATIONS

Babkin et al., "Propagation of Premixed Gaseous Explosion Flames in Porous Media", Combustion and Flame, 87:182-190, 1991.

Baek, S. W., "The Premixed Flame in a Radiatively Active Porous Medium", Combustion Science & Technology, 1989 pp. 277-287 vol. 64.

Bell et al., "Experimental Investigation of a Staged Porous Ceramic Burner", Private Communication, Paper No. 49, Intern'l Conf. on Environmental Control of Combustion Processes, American Flame Research Committee, Oct., 1991, Honolulu, Hi, 14 pages.

Chaffin et al., "Experimental Investigation of a Porous Ceramic Burner", American Flame Research Committee, Spring Meeting, Hartford, Conn., Mar. 18-19, 1991, 8 pages.

Chen et al., "Experimental & Theoretical Investigation of Combustion Within Porous Inert Media", Poster Paper p. 22-207, 22nd Intern'l Symposium on Combustion, Seattle, Wash., Aug. 1988.

(List continued on next page.)

Primary Examiner—Carroll B. Dority
Attorney, Agent, or Firm—Woodcock Washburn Kurtz Mackiewicz & Norris

[57] ABSTRACT

Methods and apparatus are provided for establishing and controlling the stability and movement of a reaction wave of reacting gases in a matrix of solid heat-resistant matter, wherein such reacting gases may be recuperatively pre-heated. At least a portion of the bed is initially preheated above the autoignition temperature of the mixture whereby the mixture reacts upon being introduced into the matrix thereby initiating a self-sustaining reaction region, after which the pre-heating can be terminated. The stability and movement of the wave within the matrix is maintained by monitoring the temperatures along the flowpath of the gases through the bed and adjusting the flow of the gases and/or vapors or air to maintain and stabilize the wave in the bed. The method and apparatus provide for the reaction or combustion of gases to minimize $NO_x$ and undesired products of incomplete combustion. A recuperative heat exchange system is used to preheat the reactants with heat generated by the reaction by channeling hot exhaust gases through the matrix surrounding reactant inlet tubes.

56 Claims, 14 Drawing Sheets

U.S. PATENT DOCUMENTS

| | | |
|---|---|---|
| 4,047,876 | 9/1977 | Rice ............................................ 431/7 |
| 4,087,876 | 5/1978 | Fillman et al. ........................ 14/72.5 |
| 4,252,070 | 2/1981 | Benedick ............................... 110/211 |
| 4,259,088 | 3/1981 | Moss ..................................... 48/212 |
| 4,284,401 | 8/1981 | Tatebayashi et al. .................. 431/7 |
| 4,310,020 | 1/1982 | Jesperson et al. .................... 137/563 |
| 4,400,356 | 8/1983 | McVay et al. ......................... 422/171 |
| 4,475,884 | 10/1984 | Shang et al. ......................... 431/170 |
| 4,529,374 | 7/1985 | Malik et al. ........................... 431/7 |
| 4,593,754 | 6/1986 | Holl ................................... 165/109.1 |
| 4,627,812 | 12/1986 | Kelly et al. ........................... 431/7 |
| 4,643,667 | 2/1987 | Fleming ............................... 431/7 |

(List continued on next page.)

OTHER PUBLICATIONS

DeSoete, G., "Stability and Propagation of Combustion Waves in Inert Porous Media", XI Symposium (Intern'l) on Combustion, 1967, pp. 559–566.

Echigo et al., "Radiative Heat Transfer Enhancement to a Water Tube by Combustion Gases in Porous Media", Presented at Intern'l Symposium on Heat Transfer, Beijing, 1985, Heat Transfer Science & Technology, Ed. By-Xuan Wang, pp. 703–710, 1987.

Egolfopoulos et al., "Laminar Flame Speeds of Methane–Air Mixtures Under Reduced and Elevated Temperatures," Combustion and Flame, vol. 76, 375–391 (1989).

Itaya et al., "Surface Combustion of a Pre-Mixed Methane–Air Gas on a Porous Ceramic", Intern'l Chem. Engineering, Jan. 1992, vol. 32, No. 1, pp. 123–131.

Jasionowski et al., "Combustion Systems: A Porous Matrix Burner and a Surface Combustor", GRI Report No. GRI/87-0186, Dec. 1987.

Kawaguchi et al., "Premixed Combustion at a Fiber Mat", 23rd Symposium (Intern'l) on Combustion, 1990, pp. 1019–1024.

Kays et al., Compact Heat Exchangers, 3rd edition, McGraw Hill, New York, N.Y., 1984, p. 1 pp. 1–5, 35–37, 150, 151, 212 & 213.

Kays et al., Convective Heat and Mass Transfer, 2nd Ed., McGraw Hill, New York, N.Y., 1980, pp. 62, 67, 96, 97, 102–105, 198, 199, 258, 259.

Kendall et al., "Basic Research on Radiant Burners, Annual Report (Feb. 1987–Jan. 1988)", Gas Research Institute Report No. GRI-88/0097, Apr. 1988, 36 pages.

Kotani et al., "An Experimental Study on Stability and Combustion Characteristics of an Excess Enthalpy Flame", 19th Symposium (Intern'l) on Combustion, 1982, pp. 1503–1509.

Krill et al., "Firetube Boiler Fiber Burner Development Program Final Report Sep. 1982–Sep. 1986", Gas Research Institute Report GRI-86/0168, Dec. 31, 1986.

Kulkarni et al., "An Experimental and Theoretical Study of Porous Radiant Burner Performance", 23rd Symposium (Intern'l) on Combustion, 1990, pp. 1011–1018.

Kulkarni et al., "Performance of Radiant Surface Burners", Paper No. 22, The Combustion Inst., Canadian and Western States Sections, 1990 Spring Technical Meeting, Apr. 29–May 2, 1990, Banff, Alberta, Canada pp. 98–101.

McIntosh et al., "A Model of Large Heat Transfer Surface Combustion with Radiant Heat Emission", Combustion and Flame, 1991, pp. 111–127.

Perry's Chemical Engineer's Handbook: Sixth Edition; pp. 10–45, Green and Maloney, Eds., 1984.

Ruiz et al., "Enahnced Gas-Fire Infrared Combustion System", Personal Communication from R. Ruiz, Received Jan. 3, 1992.

Sathe et al., "An Experimental and Theoretical Study of Porous Radiation Burner Performance", 23rd Symposium (Intern'l) on Combustion, 1990, pp. 1011–1018.

Sathe et al., "Flame Stabilization and Multimode Heat Transfer in Inert Porous Media: A Numerical Study", Combustion Science & Technology, 1990, pp. 93–109.

Schreiber et al., "Refinery Heater Fiber Burner Demonstration Program", Gas Research Institute Report GRI-84/0016, Dec. 1983.

Strehlow, R. A., Combustion Fundamentals, McGraw-Hill Co., New York, N.Y., 1984, p. 200.

Takeno et al., "A Theoretical Study of an Excess Enthalpy Flame", 18th Symposium (Intern'l) on Combustion, 1981, pp. 465–472.

Tidball et al., "Radiation Burner Technology Base––Burner Research and Development, Final Report, Feb. 1986 to Jan. 1989", Institute Report 89/0253, Mar., 1989.

Tong et al., "Heat Transfer Characteristics of Porous Radiant Burners", Collected Heat Transfer Papers, Editor K. T. Yang, ASME, vol. 3, 1988, pp. 147–155.

Tong et al., "Improving the Performance of Porous Radiant Burners Through Use of Sub-Micron Size Fibers", Intern'l Jornal of Heat and Mass Transfer, vol. 33, No. 6, pp. 1339–1346, 1990.

Tong et al., "Radiative Heat Transfer in Porous Media With Spatially-Dependent Heat Generation", Intern'l Communications on Heat & Mass Transfer, 1987, pp. 627–637.

Xiong, T. Y., "Combined Convective-Radiative Heat (List continued on next page.)

U.S. PATENT DOCUMENTS

| | | | |
|---|---|---|---|
| 4,646,660 | 3/1987 | Bjorkman et al. | 110/210 |
| 4,688,495 | 8/1987 | Galloway | 110/250 |
| 4,716,844 | 1/1988 | Koch | 110/341 |
| 4,741,690 | 5/1988 | Heed | 431/7 |
| 4,785,768 | 11/1988 | Brown et al. | 122/4 |
| 4,807,695 | 2/1989 | Ward | 165/4 |
| 4,823,711 | 4/1989 | Kroneberger et al. | 110/236 |
| 4,828,481 | 5/1989 | Weil et al. | 431/7 |
| 4,838,782 | 6/1989 | Willis | 431/166 |
| 4,941,415 | 7/1990 | Pope et al. | 110/235 |
| 4,953,512 | 9/1990 | Italiano | 122/4 |
| 4,974,530 | 12/1990 | Lyon | 110/346 |

OTHER PUBLICATIONS

Transfer Enhancement in an Advanced Gas-Fired Surface Combustor-Heater, Annual Report, Mar. 1990-Feb. 1991", Gas Research inst. Report 91/0155, May, 1991.

Xiong, T. Y, "Experimental Study of High-Efficiency Low-Emission Surface Combustor-Heater", Private Commun., Paper No. 49, Intern'l Conf. on Environmental Control of Combustion Processes, American Flame Research Committee, Oct., 1991, Honolulu, Hi.

Xiong, T. Y., "Experimental Study of Ultra-Low Emission Radiant Porous Burner", American Flame Research Committee, Spring Meeting, Hartford, Conn., Mar. 18-19, 1991.

Yoshizawa et al., "Analytical Study of the Structure of Radiation Controlled Flame", Intern'l Journal of Heat & Mass Transfer, 1988, pp. 311-318.

Chen et al., "The Effect of Radiation on the Structure of Premixed Flame Within a Highly Porous Inert Media", ASME HTd, vol. 81, pp. 35-42 (1987).

Hsu, et al., "A Numerical Investigation of Premixed Combustion Within Porous Inert Media", Proceedings of ASME/JSME Thermal Engineering Joint Conf., Reno, N.V. Mar. 17-22 (1991) vol. 4, pp. 290-294.

Siegel and Howell, Thermal Radiation Heat Transfer, 2nd Ed. (1982) pp. 390-405.

METHOD AND APPARATUS FOR RECUPERATIVE HEATING OF REACTANTS IN AN REACTION MATRIX

RELATED UNITED STATES APPLICATIONS

This application is a continuation-in-part of U.S. patent application Ser. No. 07/871,679, filed Apr. 20, 1992, now abandoned and which is a continuation-in-part of U.S. patent application Ser. No. 07/726,060, filed Jul. 5, 1991 and now U.S. Pat. No. 5,165,884, both of which are incorporated herein by reference.

FIELD OF THE INVENTION

The present invention is directed to a method and apparatus for the controlled exothermic reaction, and, in particular, for the combustion, of gases or vapors within a bed matrix whereby the stability and movement of the reaction wave is controlled to minimize or eliminate undesirable emission products such as $NO_x$ and products of incomplete reaction such as CO and hydrocarbons, and wherein the gases or vapors may be heated prior to combustion by an efficient heat recuperation system. The present invention is also directed to a method and apparatus for heating a working fluid by passing the working fluid through pipes in thermal contact with the matrix of the aforementioned system.

BACKGROUND OF THE INVENTION

Many process streams of vapors, such as effluents from chemical processing plants, refineries, paint booth units, etc., utilize combustors to destroy the toxic or reactive constituents of the process gases or vapors prior to release to the atmosphere. Combustors are also utilized to generate energy through the oxidation of fuels such as methane. However, with increasing demands on environmental control of emissions, the use of free flames to combust such effluents is in many cases unsatisfactory. For example, standard combustors are particularly undesirable when dealing with chlorinated hydrocarbons.

A free flame also results, in some instances, in incomplete combustion and uncontrollable production of undesirable side products. Because combustors typically operate at flame temperatures on the order of 3500° F., significant amounts of unwanted $NO_x$ are often produced. Nitrous oxide ($N_2O$) and ammonia ($NH_3$) are often by-products of $NO_x$ removal techniques.

In addition, prior systems that combust harmful emissions to reduce the noxious content have been unable to adequately deal with variations in emission levels. Thus, for example, if a particular plant utilizes a batch reactor such that the emissions produced reach a peak and then gradually decrease, prior art systems have been forced to maintain the addition of a high flowrate of supplemental air and fuel at all times to produce a consistent flame that is not blown out by the fluctuations of the batch reaction fume flow.

It is therefore an object of the present invention to provide a method and apparatus for oxidative reaction of gases or vapors to minimize or reduce $NO_x$ emission and products of incomplete combustion.

It is another object of the present invention to provide a method and apparatus for utilizing the heat generated in such a reaction to preheat fuel-air mixtures prior to reaction.

It is another object of the present invention to provide a highly efficient method of heat transfer from a hot gas stream to one or more cold fluids.

It is another object of the present invention to provide a combustion system with a large turndown performance ratio (the ratio of the maximum to the minimum heat output).

It is another object of the present invention to heat a working fluid or gas with the heat generated by an exothermic reaction in a reaction matrix with a recuperative heat exchange system for heating incoming reactants.

It is a further object of the present invention to provide a method and apparatus for the destruction of gases and vapors, or the combustion of fuel, such as natural gas or organic vapors, whereby the input mixture of gases may be outside the explosion limit of the constituents. Exemplary compounds include, simple hydrocarbons, oxygenated hydrocarbons, aminated hydrocarbons, halogenated compounds, and sulfur-containing compounds.

It is yet another object of the present invention to provide a method and apparatus for the minimization of thermal-and fuel-$NO_x$ combustion by-products to levels substantially below those achievable by conventional combustion technologies such as premixed, nozzle-mixed, or staged burners, or by $NO_x$ removal processes such as Thermal De-$NO_x$ (R. K. Lyon [1975]U.S. Pat. No. 3,900,554, assigned to Exxon, Corp.), Selective Catalytic Reduction, and Rap-Re-$NO_x$ (R. Perry [c.1985]patent assigned to Technor, Inc., Livermore, Calif.).

These and other objects will be apparent from the following description, appended drawings, and from practice of the invention. In the following description of the present invention the terms "process gases," "process vapors," "fuel," "fuel mixture," "reactants," and the like will be used interchangeably to indicate chemical mixtures that can be reacted.

SUMMARY OF THE INVENTION

The present invention provides a method for establishing, maintaining, and controlling the stability and movement of a reaction wave, which is flameless, of the reaction of gases or vapors comprising the steps of directing a mixture of the gases or vapors, with air and/or oxygen, into a bed of solid heat-resistant matter, at least a portion of the bed initially being above the autoignition temperature of the mixture (typically in the range of 1400° F. (760° C.)), whereby the mixture ignites and reacts exothermally in the bed, forming the reaction wave. Within an appropriate range of inlet mixture compositions, the reaction is self-sustaining; i.e., no external heat is required to maintain the process temperature. The location and stability of the reaction wave of the reacting mixture within the bed is controlled by monitoring the temperatures along the flowpath of the mixture through the bed and adjusting the flow of gases or vapors, and air or oxygen to maintain and stabilize the reaction wave. The uniformity of the reaction wave provided by the present invention, and the increased mixing and heat treatment afforded by the matrix, the void space adjacent to the matrix, and plenum according to the present invention, provide for a high conversion of reactants to products. This method and apparatus can be functionally applied to processes where the minimization of $NO_x$ and products of incomplete combustion is desired in conjunction with either (a) destruction of a particular gas or vapor, or (b) combustion of fuel to generate heat. Additionally, the present invention allows for minimization or elimination of nitrous oxide ($N_2O$) and ammonia ($NH_3$).

The following description will be made in conjunction with reactions describing combustion, such as combustion of natural gas, but the present invention is not limited to the combustion of gases with the object of minimizing $NO_x$ and other products of incomplete combustion. The controlability and versatility of the method and apparatus according to the present invention also provide, if desired, the ability to synthesize NO, CO, hydrocarbons, or selected products of incomplete combustion, for example, by varying the outlet temperatures of the reactor, inlet composition of the stream, the residence time of the stream within the reactor, stream heating value, etc.

More particularly, the present process and apparatus provides a method for flameless combustion in a reaction matrix of gases that have been preheated by an efficient recuperative heat exchange system. This provides a method for reducing the fuel concentration required for combustion comprising the steps of directing a mixture of the gases or vapors, with air and/or oxygen, into thermally conducting feed tubes embedded in solid heat-resistant matter, the outlet of the tubes being preferably located in the interior of the bed of solid matter (although it is possible that the apparatus and process will work efficiently when the outlet of the tubes is located outside of the matrix), at least a portion of the bed initially being above approximately 1400° F (760° C.), whereby the mixture ignites and reacts exothermally in the bed in a "well-stirred reactor" configuration, creating hot exhaust gases and heating the matrix. The matrix surrounding the feed tubes is heated by forced convection from the exhaust gases, as well as inner body thermal radiation and conduction in the matrix. The feed tubes are heated by thermal radiation from the surrounding matrix, as well as conduction from the matrix and convection from the exhaust gases. The feed tubes heat the matrix interior to the feed tubes by thermal radiation, as well as thermal conduction and convection by intervening gases. The fuel mixture in a feed tube is heated by the feed tube and the matrix inside the feed tube by convection as well as thermal radiation. Within an appropriate range of inlet mixture compositions, the reaction is self-sustaining, i.e., no external heat is required to maintain the process temperature.

The heating of the gases provided by the recuperative heat exchange system according to the present invention, provides for a high conversion of reactants to products. Moreover, this conversion may be obtained at lower temperatures and residence times than those required in a conventional incinerator. There is also inherent safety in the use of a process in which there are no open flames, and in which the mixture of gases to be introduced into the matrix is relatively cool, outside the flammability limits of the constituents, and, therefore, not explosive under ambient conditions. Problems of flameouts are avoided. Moreover, from a practical viewpoint, this will most likely result in the ability to obtain required government permitting much more easily.

The invention also provides an apparatus for utilizing this method comprising a bed of solid heat-resistant matter, which bed ma be insulated from the exterior environment; means for mixing air or oxygen with the fuel gas; means for adjusting the flowrate and/or volume of the gases introduced to the bed; means for controlling the volume and/or flowrate of the fuel mixture into the matrix; means for introducing the gases or vapors into the bed through feed tubes embedded in the bed; means for utilizing the heat generated by the reaction to heat the fuel mixture entering the reaction matrix through the feed tubes; and means for exhausting the products of combustion from the bed.

The invention also provides a method for improving the efficiency of gas-to-gas heat exchange at high temperatures, by the utilization of heat exchange tubes imbedded in a matrix that acts as a radiatively-coupled fin to enhance the conveyance of heat from the gas to tube, and vice versa.

DESCRIPTION OF THE PREFERRED EMBODIMENTS

Theoretical Overview

Figure 1:
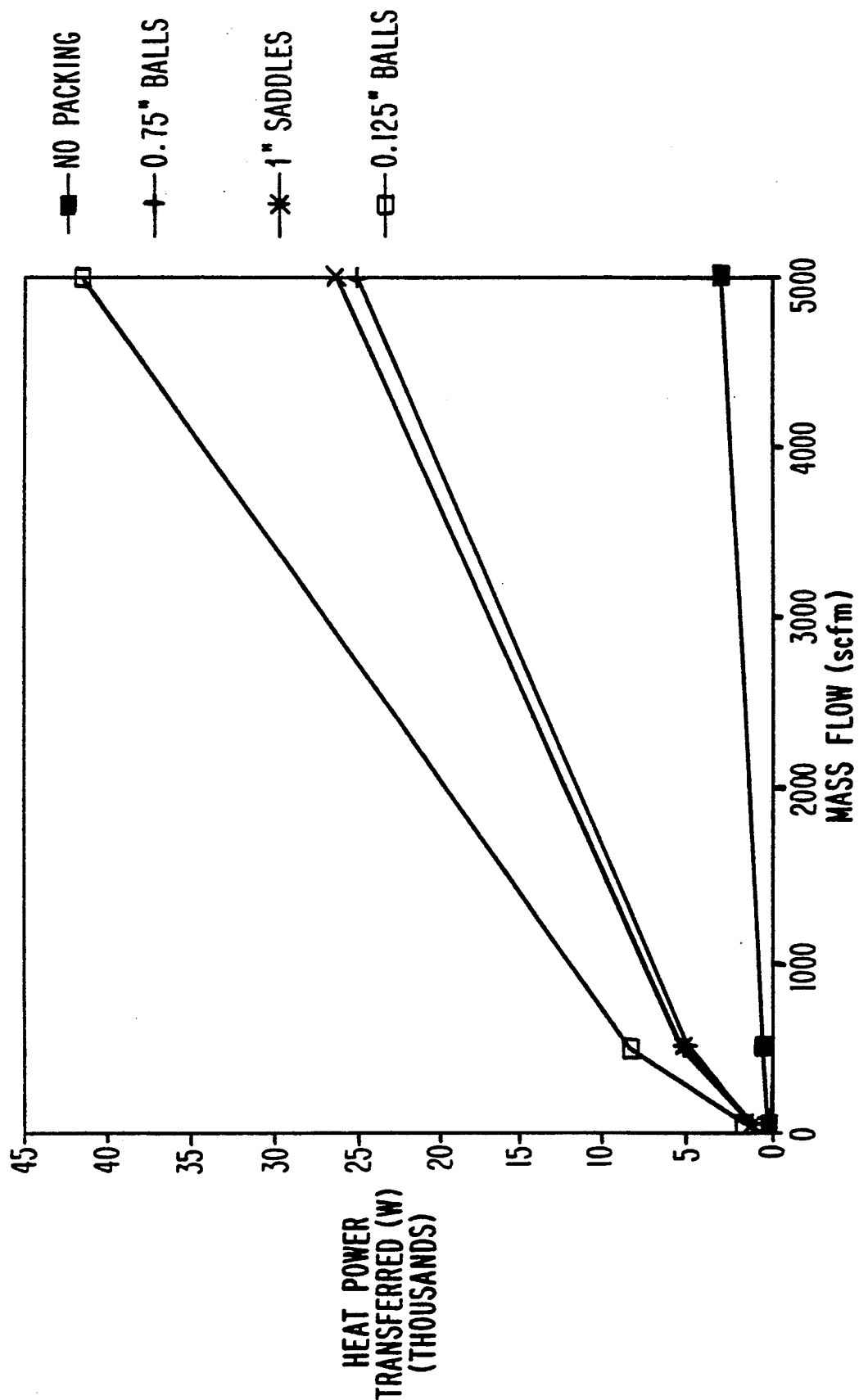
FIG. 1 plots heat transferred versus mass flow for four model heat-transfer systems.

The preferred apparatus according to the present invention contains a bed of heat-resistant material and means for monitoring the temperature along the flowpath of gases through the heat-resistant material. By monitoring the temperature of the resulting reaction wave within the bed matrix and controlling the flow and/or volume of gases entering and leaving the matrix as well as the temperature of the matrix, the reaction wave may be maintained at a relatively uniform temperature radially and at a constant location within the bed. The reaction matrix bed may be sized for any desired flow stream by altering the matrix flow cross-section, height, material, void fraction, outlet temperature, and supplemental heat or fuel value addition, if desired. Preferred matrix materials are ceramic balls, but other bed materials and configurations may be used, including, but not limited to, other random ceramic packings such as saddles or pall rings, structured ceramic packing, ceramic or metal foam, metal or ceramic wool and the like.

By maintaining the stability and uniformity of temperature of the reaction wave within the matrix, and as a result of the fundamentally enhanced reaction wave propagation mechanism of inner body surface radiation coupled with forced convection and inner matrix solids thermal conduction, it is believed that the matrix burning velocity of the mixture in the matrix may be independent of, or at least more independent of, the system pressure than the burning velocity of an identical mixture by conventional incineration. This is an improvement over conventional combustors wherein the laminar flame speed of fuel mixtures in air decreases significantly with increasing system pressure. See Egolfopoulos et al., "Laminar Flame Speeds of Methane-Air Mixtures Under Reduced and Elevated Temperatures," 76 COMBUSTION AND FLAME 375 (1989). According to the present invention, the combustion intensity of reacting gases through a unit cross-sectional area would increase directly with pressure, since the mass flow of gases would increase directly with pressure, and the matrix burning velocity is not expected to decrease with pressure. The non-negative dependence of matrix burning velocity on pressure is expected to be a result of one or both of the phenomena of in-matrix, backward-propagating, inner-body surface radiation of heat, and forced-convection of heat from the solid matrix to the incoming gases.

As a result of the laminar and plug flow characteristics of this process, and the good distribution of heat resulting from the intra-matrix surface radiation coupled with surface convection, the combustion of the fuel is more complete than flame combustion. According to the present invention, the fuel mixture is heated by heat generated by the reaction, further increasing the completeness of the reaction.

The effectiveness of the heat recuperation of the present invention is due, in part, to (a) the effects of the forced convection of the exhaust gases on the temperature profile in the matrix, (b) the role of the matrix in extracting heat from the exhaust gases and transferring that heat to the feed tubes, and (c) the role of the matrix inside the feed tubes in obtaining heat from the feed tubes and transferring that heat to the incoming process gases.

Means for extracting heat from a gas by convection and transferring that heat by radiation will be referred to as a "radiatively-coupled fin." A conventional fin enhances heat transfer from a fluid to a tube by providing additional surface area for convection, and conducting the additional heat to the tube. The matrix acts locally as a radiatively-coupled fin by enhancing convection with the gases and transferring this heat by radiation to the tubes. Radiatively-coupled fins should be distinguished from radiative heat exchange from fins to an external environment, as exemplified in Siegel and Howell, THERMAL RADIATION HEAT TRANSFER, 2nd Ed., pp.390–405. There, the fin is coupled to the main heat transfer surface (the tube) by conduction, whereas in the present invention the coupling is believed to be primarily radiative.

It is desirable to have a high recuperative effectiveness for the transfer of heat from the reaction to the incoming fuel mixture. Therefore, the heat exchange from the exhaust gases and reaction matrix materials to feed tubes is an important feature of the operation of the apparatus and method of the present invention. Because thermal heat radiation from gases is relatively small, the primary source of heat transfer from the exhaust gases to the matrix is by forced convection. Because the amount of thermal heat radiation per unit surface area goes as the fourth power of temperature, whereas the transfer of heat by conduction goes as the spatial derivative of temperature and therefore roughly as the first power of temperature, the dominant mode of heat transfer from the matrix to the feed tubes, and from the feed tubes to the matrix inside, will be by radiation at the high temperatures associated with combustion. Because the incoming process gases are "optically thin" to thermal radiation, the dominant mode of heat transfer from the interior of the feed tubes and the tube matrices to the process gases will be by forced convection. Because the temperature profile near a hot region of the matrix will decay more rapidly with distance in the absence of forced convection, the convection of the exhaust gases through the matrix surrounding the feed tubes can substantially increase the temperature in regions of the matrix distant from the combustion region. Forced convection of the exhaust gases through the matrix near the feed tubes, therefore, substantially increases heat transfer to the feed tubes at points distant from the combustion region. Additionally, the presence of the matrix enhances convection locally by disrupting the boundary layer adjacent to the tubes, and improving the conveyance of heat, as taught by U.S. Pat. No. 4,593,754 (Holl). Therefore, the matrix interior and exterior to the feed tubes, and the channeling of the exhaust gases into the region of the matrix surrounding the feed tubes, play important roles in the efficient heat recuperation of the present invention. It should be understood that these observations in no way imply that the processor of the present invention is to be limited to embodiments wherein the primary modes of heat transfer are due to the modes mentioned above.

Materials And Construction

Accordingly, the types of materials on the inside and outside of any feed tubes used should have high heat conductance by radiation, convection and conduction. The heat transfer properties of the system are also dependent on the ratio of radiative to convective heat-transfer, the temperature profiles in the feed tubes, and the number, size and spacing of the tubes. These properties may be varied either concurrently or discretely to achieve a desired effect. Optimal design choices allow the heat-transfer coefficient of the exhaust gases to the feed tubes to be in the range of 43–67 $W/m^2$-K, which is substantially higher than conventional gas convective heat exchange coefficients (generally in the range of 23–45 $W/m^2$-K (PERRY'S CHEMICAL ENGINEER's HANDBOOK, 6th Ed., pp.10–45 (1984)).

The radiative heat transfer within the bed, the walls of the combustor containing the bed, and the gas molecules within the reactor themselves are also important features of the operation of the apparatus and the method of the present invention. Therefore, the types of materials in the bed may be varied so that the inner body heat transfer characteristics, the radiative characteristics, the forced convective characteristics, and the inner matrix solids thermally conductive characteristics may be controlled within the bed. This may be done by varying the radiative heat transfer characteristics of the matrix by using different sizes of bed materials to change the mean free radiative path or varying the emissivity of the bed materials, varying the forced convection heat transfer characteristics of the matrix by varying its surface area per unit volume, or geometry, varying the inner matrix solids thermally conductive heat transfer characteristics of the matrix by using bed materials with different thermal conductivities, or changing the point to point surface contact area of the materials in the bed. These properties may be varied either concurrently or discretely to achieve a desired effect.

In addition to changing the properties of the reaction matrix itself, an interface or several interfaces can be introduced into the bed where one or more of the heat transfer properties of the bed are discretely or concurrently changed on either side of the interface and wherein this variation serves to help stabilize the wave in that location and acts as a "reaction wave anchor." This may be done, for example, by introducing an interface where void fractions change across the interface within the bed. The interface may change the mean free radiative path across the interface independent of the void fraction. By changing materials, the emissivity may change across the interface within the bed. Changing the area per unit volume of the bed media across an interface, the forced convective heat transfer characteristics may change as the gas is passed across the interface.

The matrix cross-section perpendicular to the flow axis may be configured in a circular, square, rectangular, or other geometry. The area of the cross-section may be intentionally varied (i.e., as a truncated cone or truncated pyramid) to achieve a wide stable range of reactant volumetric flowrates at each given matrix burning velocity.

The materials of the bed matrix are preferably ceramic balls or other types of random, heat-resistant packing. To evenly distribute incoming gases there will typically, but not necessarily, be a plenum, preferably made of a heat-resistant material such as brick or ceramic balls, in which incoming gases will be preferably distributed and further mixed prior to entering the bed. If a plenum of brick or ceramic balls is used, it will typically comprise a section with very low radial pressure drop, so that cross-sectional gas distribution is maximized, and it will also cause a slight pressure drop (approximately ¼ inch to 10 inches (0.635–25.4 cm) Water Column) across the plenum interface prior to the bed in order to more evenly distribute the gases entering the bed. In addition, the plenum may provide an interface, with varying heat transfer characteristics on either side of the interface, in the junction between the plenum and the bed.

The exterior reactor walls contain the process flow during operation, and are preferably made of carbon steel. The exterior walls may be lined with a non-permeable, corrosion-resistant coating and a refractory insulating material, such as firebrick, that may be coated with a porosity-reducing compound. Dense castable refractory materials, backed up with insulating refractory materials, such as ceramic fiber board and ceramic fiber blanket, are also preferred lining materials. Other preferred materials are Haynes Alloy No. 214, Inconel Alloy No. 600, Inconel Alloy No. 601, Stainless Steel No. 310 and Stainless Steel No. 309.

To bring the gases and/or matrix up to the desired temperature prior to starting the reactor, preferably a preheater may be utilized to preheat the packed bed matrix.

In one embodiment of the present invention, the matrix bed is comprised of a unitary metallic material. Use of such a matrix piece has several advantages. First, the unitary item can be firmly attached to the reactor walls. Second, the use of metallic material may result in a lighter overall combustor. Third, by having the metallic material in direct contact with the reactor, the entire matrix can be preheated by use of electrical resistive heating.

Convenient means for mixing the gases and/or oxygen prior to entering the bed may be utilized, such as a venturi-type or twisted insert static gas-air mixer. An outlet must be provided to allow for gases to escape during preheating and/or processing. Temperature sensing means such thermocouples will usually be located in thermowells inserted into the bed. Typically, there will be thermowells located at inlet and outlet ports and in the void spaces in the bed.

A programmable control system may be utilized using the outputs from the thermocouples to automatically adjust the dilution air and/or fuel t maintain the stability and location of the reaction wave within the bed. Due to the inherently stabilizing thermal mass of the matrix, the reactant gases may be introduced in a continuous or intermittent manner.

For a reactor that processes corrosive gases such as chlorine, hydrogen chloride, sulfur dioxide and others, the steel shell may be maintained at moderately high temperature, preferably 300° to 400° F. (150°–205° C.), to minimize dewpoint corrosion. In addition, the carbon steel shell may be lined with dewpoint corrosion resistant materials, such as Fortress High Temperature Stalastic bitumastic coating (Witco). A porosity-reducing coating, such as Alundum Patch Primer (Norton) on the refractory surface may also reduce the permeation of corrosive agents from the interior of the processor to the carbon steel shell. The interior temperature of the reactor may typically be maintained between 1400° and 3500° F. (760°–1925° C.), depending on the process requirements.

Embodiments And Advantages

In a typical process, a preheater is used, fired for example with natural gas, to heat the plenum, if present, and the bed in order to raise the bed temperatures above the autoignition point of the gases that will be used. The pre-heater can be any device that will raise the temperature of the bed directly, or any device to pre-heat gases that can then be channeled into the bed to pre-heat the bed itself. Pre-heating devices include: gas burners, electric heaters mounted exterior to or interior of, the matrix, inductive heaters, radiant tube heaters, etc. If the matrix is metallic, a resistive heater may be used. Once a sufficient temperature has been achieved throughout the entrance portion of the processor, or, in other embodiments, at the outlet ends of the feed tubes, preheating is ceased.

In one embodiment, ambient air is then forced with pressure into the plenum, if used, and into the bed until the plenum is cooled to a temperature below the autoignition of the process gases to be introduced. By introducing ambient air through the plenum, the plenum cools the quickest, while the matrix temperature remains largely above the autoignition temperature although the matrix immediately adjacent to the plenum will be cooled below the autoignition temperature.

The process gas is then introduced into the plenum, if used, and the bed. A flameless combustion wave is established in the matrix whereby the compounds are ignited and oxidized to stable products, such as water and $CO_2$. The combustion wave is observed as a steep increase in bed temperature from ambient temperature on the inlet side of the wave to approximately the adiabatic flame temperature of the mixture on the outlet side of the wave. This rapid change takes place over a distance of usually several inches in a typical pilot processor, with the actual distance being dependent upon feed concentrations, feed rates, gas velocity distribution, bed material, and bed physical properties, type of specific feed materials, etc. Heat losses in the direction of flow also will have an effect on the length of the combustion wave. The wave may be moved with, against or stationary relative to the inlet feed direction by varying the feed gas concentration or flowrate. If necessary, heat may be added to or removed from the incoming gases to further stabilize the wave.

The temperature of the combustion is dependent upon feed concentrations, feed rates, gas velocity distribution, feed tube material, the size, number and placement of feed tubes, bed physical properties, type of specific feed materials, heat losses, etc. If desired, cooled surfaces such as water-containing pipes may be inserted into, or around, the matrix to remove heat from the reacting gases and stabilize the reaction region. Temperature information within the matrix bed may be monitored and used to control feed rates, feed concentrations, cooling systems, etc.

A major advantage of the present invention is that the process according to the present invention is extremely safe in that the gaseous reactants for the reaction (combustion) wave may be maintained, upon entry into the matrix, at, or below, the lower explosive limit (LEL) for the gaseous mixture. This lessens the chance of accidental and premature burning or explosion. Furthermore, the concentration of incoming reactants may be maintained at, or above, the upper flammability limits of the mixture of gases, further adding to the safety features of the invention, or the concentration of incoming reactants may be maintained between the upper and lower flammability limits of the mixture of gases.

While combustion intensities from $1.6 \times 10^8$ $W/m^3$ to $8 \times 10^8$ $W/m^3$ have been achieved at sub-LEL conditions in a pilot unit, it is believed that combustion intensities from $1.6 \times 10^7$ $W/m^3$ to $4 \times 10^{10}$ $W/m^3$ are achievable with this method at pressures from 0.1 to 10.0 atmospheres; or for atmospheric pressure applications, combustion intensities from $1.6 \times 10^8$ $W/m^3$ to $4 \times 10^9$ $W/m^3$ are achievable. Conventional technologies, such as domestic boilers, navy boilers, industrial gas turbines, aircraft gas turbines, well-stirred reactors, and premixed laminar flame zones generate a maximum energy output at atmospheric pressure of $10^5$, $2 \times 10^6$, $10^7 10^8$, $2 \times 10^9$, and $3 \times 10^9$ $W/m^3$, respectively (see R. A. Strehlow, COMBUSTION FUNDAMENTALS, McGraw-Hill Co., N.Y., N.Y. (1984), p.200). The high volumetric rates of heat release for the combustor of the present invention indicate that extremey compact devices may be constructed.

A plenum is preferably utilized at the entry of the bed for uniformity of mixing, cross-sectional velocity profiles, and temperature of the incoming gases. It is believed that this helps to achieve a relatively flat cross-sectional profile of the combustion wave perpendicular to the direction of the flow of the gases through the bed. In some instances the plenum may be desirable to achieve the flatness of the cross-section of the wave, depending on the configuration of the matrix.

In an embodiment utilizing the enhanced recuperative aspects of the present invention, the reactants are introduced to the matrix by a plurality of feed tubes extending into the matrix. It is believed that a uniform distribution of the tube outlets helps to achieve a relatively homogeneous combustion region in the bed. A combustion region with an average velocity of zero (although local velocities may be large), and no chemical concentration gradients (though reactants constantly enter and leave the reaction region) is referred to as a well-stirred reaction zone. The size and geometry of the region above the feed tubes, the flow rate of the reactants, and the sizes and spacings of the tubes are design criteria that influence the amount of stirring in the reaction zone. The first two factors also influence the residence time of reactants within the reaction zone.

While in some instances a relatively flat cross-sectional profile, or a well-stirred or relatively homogeneous combustion region may be desirable, this uniformity is not necessary for the device to work, and in some instances a non-homogeneous combustion region, or a non-flat, spherical, or bullet-shaped profile may be desirable. In some cases, a gas permeable barrier such as heat resistant screen or perforated plate may be beneficial to help maintain the mechanical integrity of the matrix during operation where high gas velocities or excessive vibrations occur.

The reaction wave may move or remain stationary relative to the inlet flow direction by increasing or decreasing the percentage of fuel in the inlet mixture. For applications where it is desirable to use gas mixtures below their respective flammability limits, the method is functional at relatively low fuel concentrations, for example from 1.3 to 4.8 volume percent of natural gas in air. For other applications, where the reaction of fuel and oxygen in near- or super-stoichiometric proportions is desired, the method can function at much higher fuel concentrations, for example from 5 to 25 volume percent natural gas in air, if heat-resistant materials are used in the device.

Alteration of the flowrate and composition of the inlet stream may be used to cause the combustion wave to migrate; however, this motion is slow due to the large thermal mass of a typical matrix. For instance, the flowrate may be controlled to prevent or encourage combustion inside, above, or around feed tubes. Similarly, unplanned fluctuations in the flowrate and/or composition of the inlet stream may also cause wave migration. However, this effect may be reversed by one or more counteracting process changes issued by a programmable controller to control valves governing supplementary fuel and dilution air, in response to changes in sensed temperatures along the bed. The system may be designed so as to minimize combustion dead-zones.

In a typical processor as described in further detail hereinbelow using methane as a feed gas, the destruction and removal efficiency (DRE) of methane has been shown to be greater than 99.99%. The emission levels of thermal-$NO_x$ in the same combustor was less than 0.005 lb (2.3 gm) of $NO_x$ (as $NO_2$) per million BTU, and the CO levels have been observed to be below the lower detection limit (10 parts per million) of the CO analyzer used. Typically, levels of nitrous oxide will not exceed 0.3 parts per million by volume. Because the present invention typically operates at temperatures (1550°-1850° F.) significantly below those present in standard combustors (about 3500° F.), there is less production of the undesirable $NO_x$ by-products.

The DRE of the present invention is significantly greater than is presently achieved by prior art devices. Many current combustors achieve DRE's of only about 95%. These DRE's reflect a cost balancing that results in a trade-off in the prior art between DRE and heat recuperative efficiency. Higher DRE's might be achieved with a consequent decrease in recuperative efficiency. The present invention, however, achieves high DRE's while still maintaining high recuperative efficiency.

The burning velocity of the reactant gases in the matrix as described in further detail hereinbelow, even when measured at conditions below the conventional flammability limit of methane in free air, has been observed to be as much as 2 to 10 times greater than the fastest known laminar flame speed of methane in free air.

The turndown performance, i.e., the ratio of the maximum to the minimum heat output, of a system of the present invention is at least five to one. It is anticipated that the turndown performance for this type of system can be 100 to 1, or greater.

While the above-described information has been observed, it is contemplated that there is no limit, i.e., minimum or maximum flowrate, by which the technology may be utilized. Various plenum configurations, if used, may also be utilized for gas distribution in addition to those described herein in the attached figures. The flow direction is also not believed to be critical so that the system may be preheated or fed from the bottom up, top down, sideways, fed at alternative points in the processor, or the direction of feed may also be alternated. For example, it is also possible to reverse the flow of gases through the processor and channel the exhaust gases out of the processor through feed pipes if they are used.

The preheating means may be electric or any other kind of heating means, and supplemental heating of the process gases may be utilized. The combustion wave may also be utilized in conjunction with regenerative heat recovery or with internal heat recuperation components identical to or similar to those conventionally available for heat recovery systems. While the present invention contemplates bed material without catalysts, a combined inert bed and catalyst may be used to enhance process characteristics such as reaction rate, if so desired. Use of a catalyst may allow for the use of lower operating temperatures. However, a primary feature of the invention is that the catalyst is not a necessity to the operative functions of the reaction matrix.

Typically a matrix according to the present invention will comprise a ceramic, which may be randomly packed or structurally packed. Preferred random packing comprises ceramic balls that may be layered. Generally, for combustion of hydrocarbon gases, the ceramic balls are useful if they have a diameter from about 0.0625 to 3 inches (0.159-7.62 cm), preferably about ¾ inch (1.9 cm). Another useful configuration is the use of random ceramic saddles typically from 0.0625 to 3 inch (0.159-7.62 cm) nominal size, preferably about ½ to 1.5 inches (1.27-3.81 cm) nominal size. Other useful packing materials are pall rings and raschig rings with diameters from about 0.0625 to 3 inches (0.159-7.62 cm), and preferably from about ½ to 1.5 inches (1.27-3.81 cm).

A ceramic foam material may also be utilized. Typical foam material may be utilized that has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic material may be utilized such as honeycomb shape ceramic. Instead of a ceramic, the heat-resistant matter used to form the bed may also be a metal, which may be randomly packed or may have a structured packing.

Generally, the void fraction of the matrix bed will be between 0.3 and 0.9. In addition, the material in the matrix bed will typically have a specific surface area ranging from 40 $m^2/m^3$ to 1040 $m^2/m^3$.

In a preferred embodiment, a combustion wave of hydrocarbon gases may be stabilized and maintained in a ceramic matrix wherein the combustion wave is characterized by a length scale of greater than 0.1 centimeter, preferably about 2 to 16 inches (5-40 cm) and most preferably about 8 inches (20 cm). In general, a combustion wave according to the present invention is characterized by a length scale of 1 to $10^9$ times the combustion wave length scale of an identical mixture, combusting under identical conditions, in absence of the matrix. Typically, a combustion wave according to the present invention may be characterized by a length scale of 1 to $10^6$ times the combustion wave length scale, and most preferably 1 to 1,000 times the combustion wave length scale of an identical mixture under identical conditions, in absence of the matrix. A combustion wave according to the present invention may be characterized by a length scale of to 100 times the combustion wave length scale of an identical mixture combusting under identical conditions in absence of the matrix.

In addition to its use as a stand-alone processing device, the apparatus of the invention may be employed as an add-on to conventional technology so as to incorporate the benefits of the invention, such as fluctuation dampening capability, etc. The matrix may be appended, for example, to the outlet of a conventional incinerator to provide an additional margin of safety to handle process fluctuations. The matrix material acts as a significant heat sink that compensates for variations in the concentration of the emissions being processed. The advantage of this heat sink is that there will be minimal need for additional outside heating of the matrix, in comparison to prior art techniques that require the addition of fuel or other methods of heating the combustion chamber during periods of low emissions. Thus, for example, the present invention can be particularly useful when dealing with a batch reactor that achieves a high level of emissions early in the process but where the level of emissions then tails off to substantially lower levels.

It is believed that the use of the matrix, as well as the use of a plenum prior to entry into the matrix, results in a well-stirred reaction which promotes more complete combustion and resulting lower harmful emissions. Thus, apart from its heat sink and heat transfer properties, the matrix materials serve the important function of ensuring maximum mixing. It is believed that the DRE's of prior art techniques suffered in part due to inefficient mixing.

It is also possible that the use of a void space adjacent to the matrix through which the process gases pass prior to entering the combustion wave zone of the matrix also assists in achieving even distribution of the gases, thereby aiding in the control of the combustion wave.

Among the advantages of the present invention is the ability to control and diminish the undesirable products of combustion of typical fuels by controlling the stability of the combustion wave within the heat-resistant matrix, or by preheating the fuel mixture, in accordance with the present invention. For example, the $NO_x$ content of combustion of hydrocarbon gases may be lowered to within the range of about 0.1 to 40 parts per million by volume, dry basis, adjusted to 3% oxygen. Similarly, the carbon monoxide content of combustion of hydrocarbon gases may be controlled to be less than 50 parts per million, and preferably within the range of about 0.1 to 10 parts per million by volume, dry basis, adjusted to 3% oxygen. Other products of incomplete combustion may be controlled to comprise less than about 5 parts per million of the total gaseous products, by volume, dry basis, adjusted to 3% oxygen. The present invention also allows for good destruction of chlorinated hydrocarbons that cannot be adequately dealt with in standard combustors.

Since the combustion or reaction wave according to the present invention is maintained within a matrix, rather than an open flame in a chamber or in open atmosphere, many more controls may be imposed upon the characteristics of the combustion. The objects that comprise the heat-resistant matter in the bed may be selected by size and shape to obtain a predetermined mean-free radiative path in the matrix. Furthermore, the materials of the heat-resistant matter may be selected so that particles may be placed within the bed having appropriate emissivities to obtain a predetermined back heat transfer from the particles into the combustion or reaction region, thereby improving the desirable characteristics and stability of the wave and of the combustion. As a result of eliminating the need for an open flame, the present invention avoids the problems of explosivity and flame-outs. Furthermore, lack of flame will enable the user to obtain government permitting more easily, a significant advantage when dealing with today's stringent regulations.

One of the characteristics attainable by the present invention is the stabilization of the combustion or reaction wave at feed flowrates such that the velocities of the mixtures of gases entering the wave, when calculated and adjusted to the conditions of standard temperature and pressure, are greater than the laminar flame speed of the mixture at the same conditions in absence of the matrix. This calculated velocity may be obtained using the present invention whereby the velocity is about 1 to 1,000 times greater than the laminar flame speed, preferably 1 to 50 times greater than the laminar flame speed, which therefore allows for greater throughput of the reaction gases than that of conventional combustion.

As further demonstration of the improvements attainable by the present invention, the combustion wave utilizing the present invention may be stabilized at feed flowrates such that the calculated velocities of the mixtures of gases entering the wave, adjusted to conditions of standard temperature and pressure, are greater than the turbulent flame speed of the mixtures at the same conditions without the matrix. This calculated velocity may be 1 to 1,000 times greater than turbulent flame speed and preferably 1 to 10 times greater than turbulent flame speed.

As yet a further demonstration of the improvements attainable by the present invention, a combustion wave maintained and stabilized according to the present invention may typically be characterized by a heat release per unit cross-sectional area that is higher than the heat release per unit cross-sectional area in a laminar or turbulent flame of an identical gaseous mixture at identical conditions, in absence of the matrix of the present invention. Preferably the heat release per unit cross-sectional area for combustion of a typical hydrocarbon gas is 1 to 50 times higher than that observed in a laminar flame or a turbulent flame of an identical mixture of gases at identical conditions, in the absence of the matrix according to the present invention. When used with the recuperative aspect of the invention, the system of the present invention requires as little as one-fourth as much fuel to produce the same mass throughput and combustion temperature as a similar system without recuperative heat transfer.

Whereas the loss of mechanical power from the pumping of a liquid through a heat transfer system is generally small, for gases the loss of mechanical energy due to friction may approach the magnitude of the heat energy transferred. As a rule of thumb, for heat transfer systems using gases, mechanical energy is considered to be 4 to 10 times more valuable than heat energy (see W. M. Kays & A. L. London, COMPACT HEAT EXCHANGERS, 3rd Ed., McGraw Hill, N.Y.C. (1984), p.1). The analysis below compares the heat transfer and frictional losses between three hypothetical matrix-based heat exchangers utilizing the recuperative aspect of the present invention and one without a matrix, to illustrate the practical benefits of the invention.

A calculation of the heat transfer from hot exhaust gases to the inlet tubes for processors with various types of matrix materials, and a processor with no matrix, can be made using well known friction and heat transfer properties for matrix materials (see Kays & London) and for shells and tubes (see W. M. Kays & M. E. Crawford, CONVECTIVE HEAT AND MASS TRANSFER, 2nd Ed., McGraw Hill, N.Y.C. (1980)).

The following analysis assumes a 66-inch (168 cm) long cylindrical processor with a 41-inch (104 cm) diameter. The exterior walls do not participate in heat transfer or friction. Thirty-one 3-inch (7.6 cm) tubes run longitudinally through the shell in a triangular-pitch pattern. The hot exhaust gases are assumed to enter the matrix at 2000° F. (1090° C.), and the entirety of the matrix is assumed to be held at 1600° F. (870° C.). This analysis assumes no radiative heat transfer from the exhaust gases to the tubes, and radiation without resistance from the matrix to the tube. It should be noted that the results given below depend on the structure of the processor and matrix and the chosen temperatures used in the calculation. Although the present results are instructive, optimally the comparison would utilize a full recuperative heat transfer model over a range of operating conditions.

FIGS. 1, 2, 3, and 4 plot the heat exchange properties for processors with three types of matrix materials, and a processor with no matrix (no packing). The table below lists the specific surface area (the ratio of matrix material surface area per unit volume) and the void fraction for the matrix in each case.

| Material | Specific Surface Area (m$^2$/m$^3$) | Void Fraction |
| --- | --- | --- |
| 0.75 inch (1.9 cm) balls | 196 | 0.46 |
| 1 inch (2.5 cm) saddles | 232 | 0.71 |
| 0.125 inch (0.32 cm) balls | 1047 | 0.46 |
| No packing | 8.8 | 1.0 |

FIG. 1 plots the heat power transferred in watts versus the mass flow in standard cubic feet per minute (scfm) for the four systems. The 0.125 inch (0.32 cm) balls have the highest heat transfer, followed by the 1 inch (2.5 cm) saddles, 0.75 inch (1.9 cm) balls, and finally the system without a matrix. The superiority of the 0.125 inch (0.32 cm) balls is due to their higher specific surface area, and therefore total surface area, which results in a higher convective heat transfer. A comparison of the system without a matrix to systems with matrices shows that the matrix materials improve convective heat transfer by almost an order of magnitude.

Figure 2:
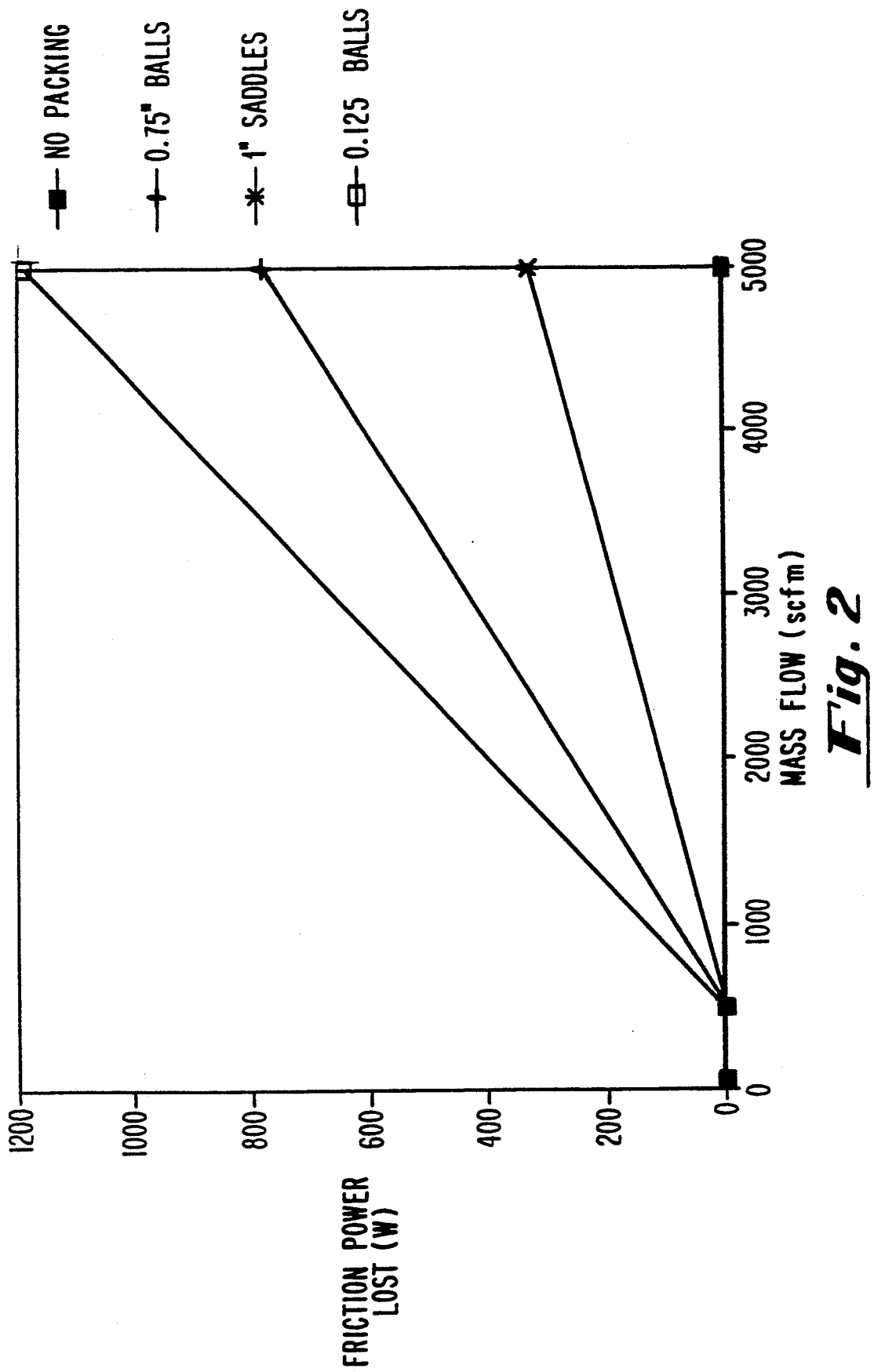
FIG. 2 plots frictional power loss versus mass flow for the four model heat-transfer systems.

FIG. 2 plots frictional power loss versus mass flow for the four systems. Here, a trend similar to that shown in FIG. 1 exists, with the smallest balls showing the highest frictional power loss, and the system without a matrix showing relatively little. An interesting difference is that the saddles, while equally as effective in transferring heat as the larger balls, lose less than half as much energy due to friction. Because this analysis idealizes the radiative heat transfer, it does not include the effect of changes in radiative mean free path, which may result from a change in packing size. This change in radiative mean free path may offset, to some extent, the gain in overall heat transfer due to the improvement in convective heat transfer.

Figure 3:
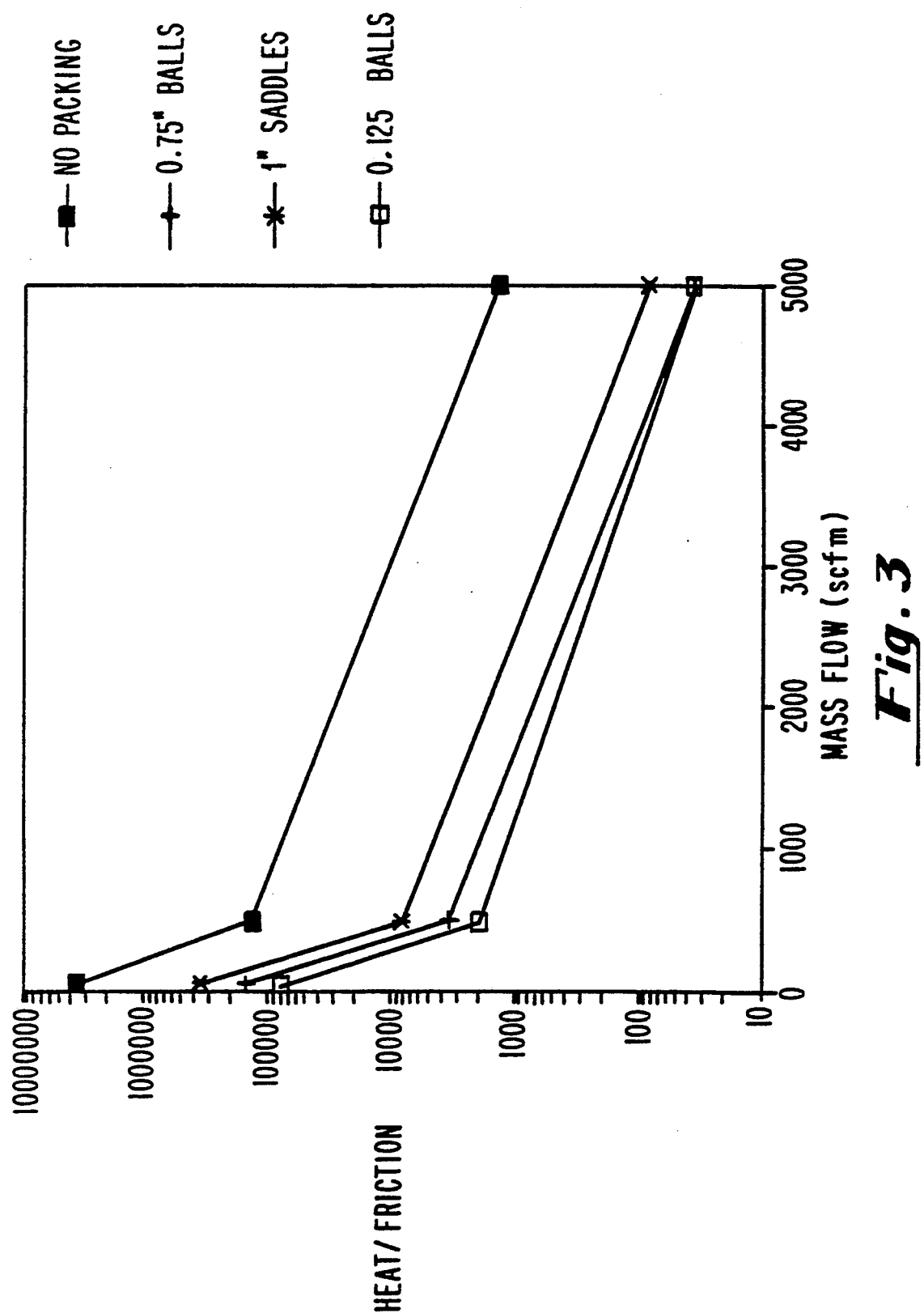
FIG. 3 plots the ratio of heat transferred to frictional power loss versus mass flow for the four model heat-transfer systems.

FIG. 3 plots the ratio of heat transfer to frictional power loss from FIGS. 1 and 2 versus mass flow for the four systems. The system with no matrix has the highest value, and the 0.125 inch (0.32 cm) balls have the lowest value of this ratio. However, in all cases the ratio is above 30. Recalling that mechanical energy is 4 to 10 times more valuable than thermal energy, each of these systems provides a net gain.

Figure 4:
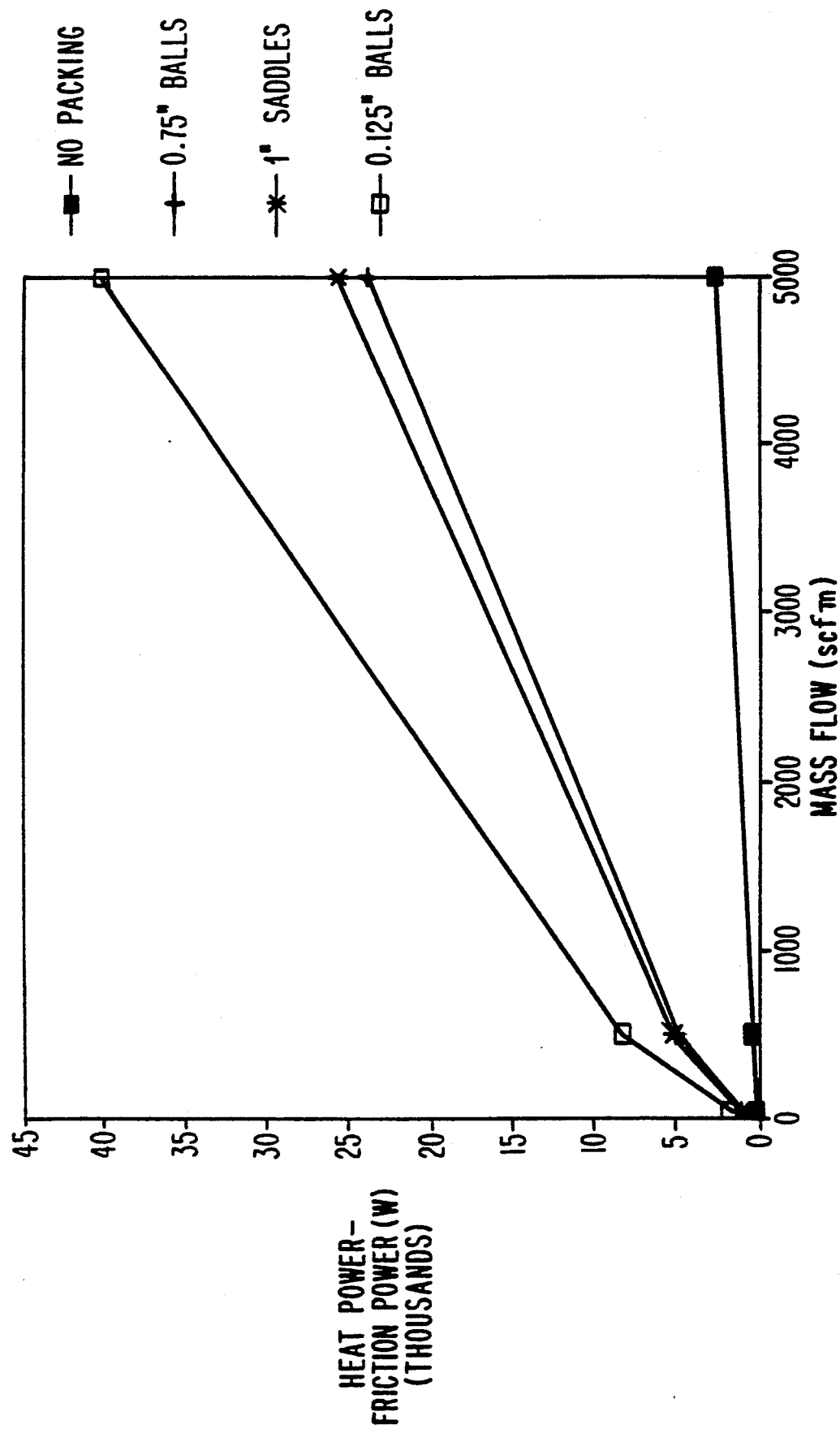
FIG. 4 plots the difference between heat transferred and frictional power loss versus mass flow for the four model heat-transfer systems.

FIG. 4 plots the difference between the heat transfer and frictional power loss versus mass flow.

The systems with matrices are clearly superior to the system without a matrix in this respect. Since heat transferred implies fuel saved and friction losses imply that extra horsepower must be supplied by the blowers, this graph indicates that a small characteristic length scale of the matrix material is preferable.

Embodiments Not Utilizing Enhanced Recuperative Heating

Figure 5:
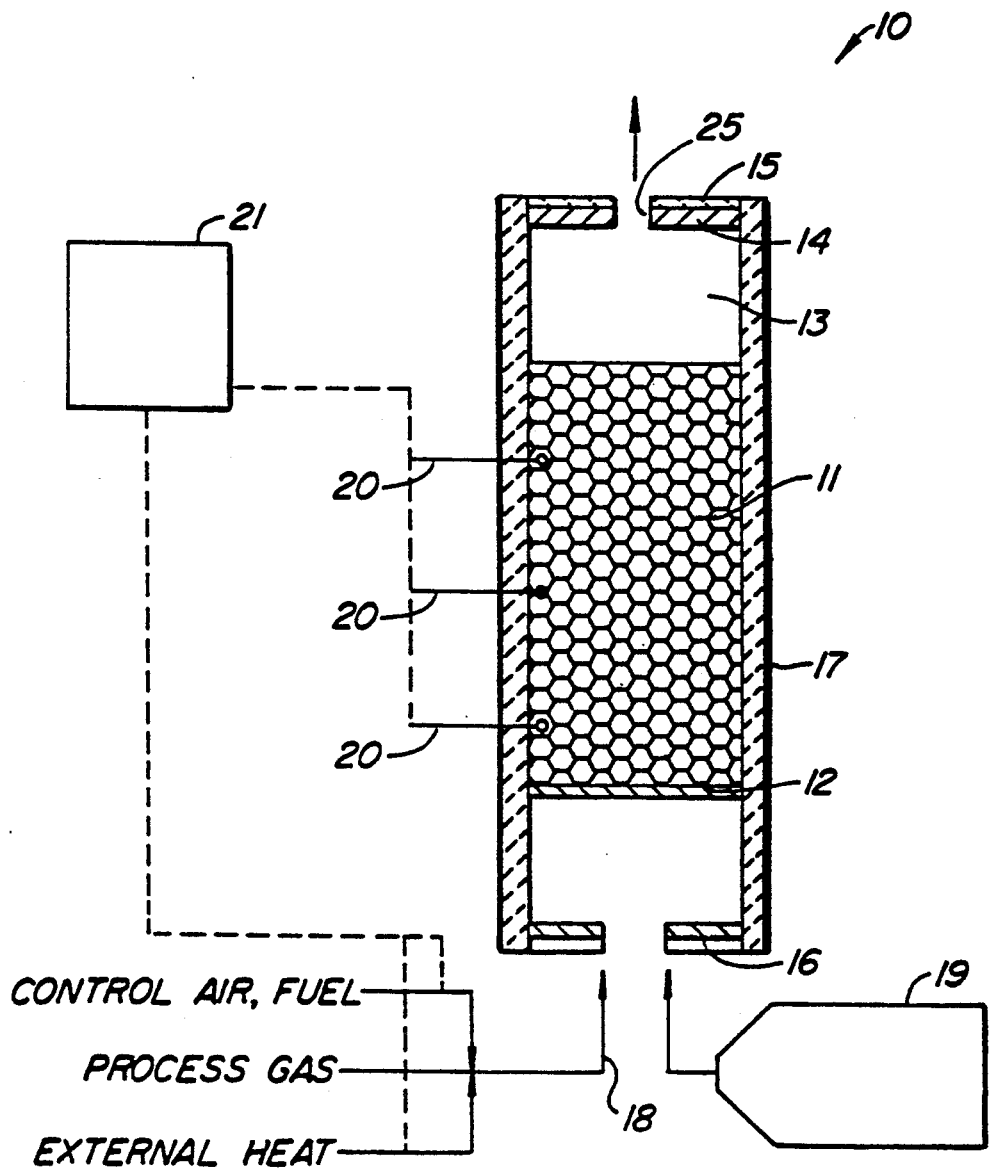
FIG. 5 is a schematic view of an apparatus for use in accordance with the present invention without using the enhanced recuperative aspect.

Referring to the remaining figures, in which like numbers designate like components, FIG. 5 is a schematic diagram of a cross-section of an apparatus used for practicing the process according to the present invention without the use of enhanced recuperative heating. The apparatus comprises of a processor (10) comprising a matrix (11) of heat-resistant packing material supported at the bottom by a plenum (12) for distributing the gases as they enter into the matrix (11). The void (13) over the top of the matrix (11) precedes the outlet (25) that penetrates the end wall (14) made of a dense castable refractory material behind which there is an insulating layer (15). The product gases exit through the refractory (14) and insulator (15) through the outlet (25). A dense castable refractory material (16) also seals the bottom of the processor (10). The sides of the processor (10) are encased with a insulated shell (17), preferably made of steel and lined on the inner surface with another insulating heat-resistant material such as firebrick. The inner surface of the steel may be protected by an appropriate corrosion-resistant material. Through the bottom of the processor (10) is an inlet means (18) through which controlled air, fuel, and/or process gas is introduced into the processor (10). If necessary, the fuel or process gas may be heated prior to introduction to processor (10) by applying external heat to the mixed process gas prior to entering the processor (10) through line (18). The plenum and lower portion of the matrix (11) may be heated by a suitable preheater (19) that, for example, may pass forced heated air into the processor (10). At various points in the matrix (11) are located temperature sensing devices such as thermocouples (20) from which the output is fed into a microprocessor or programmable logic controller (PLC) (21) that in turn controls the input of the fuel and/or process gas and control air or heat supply to control the proportions, flow and temperature of the input gases entering through line (18) into the processor (10).

Figure 6:
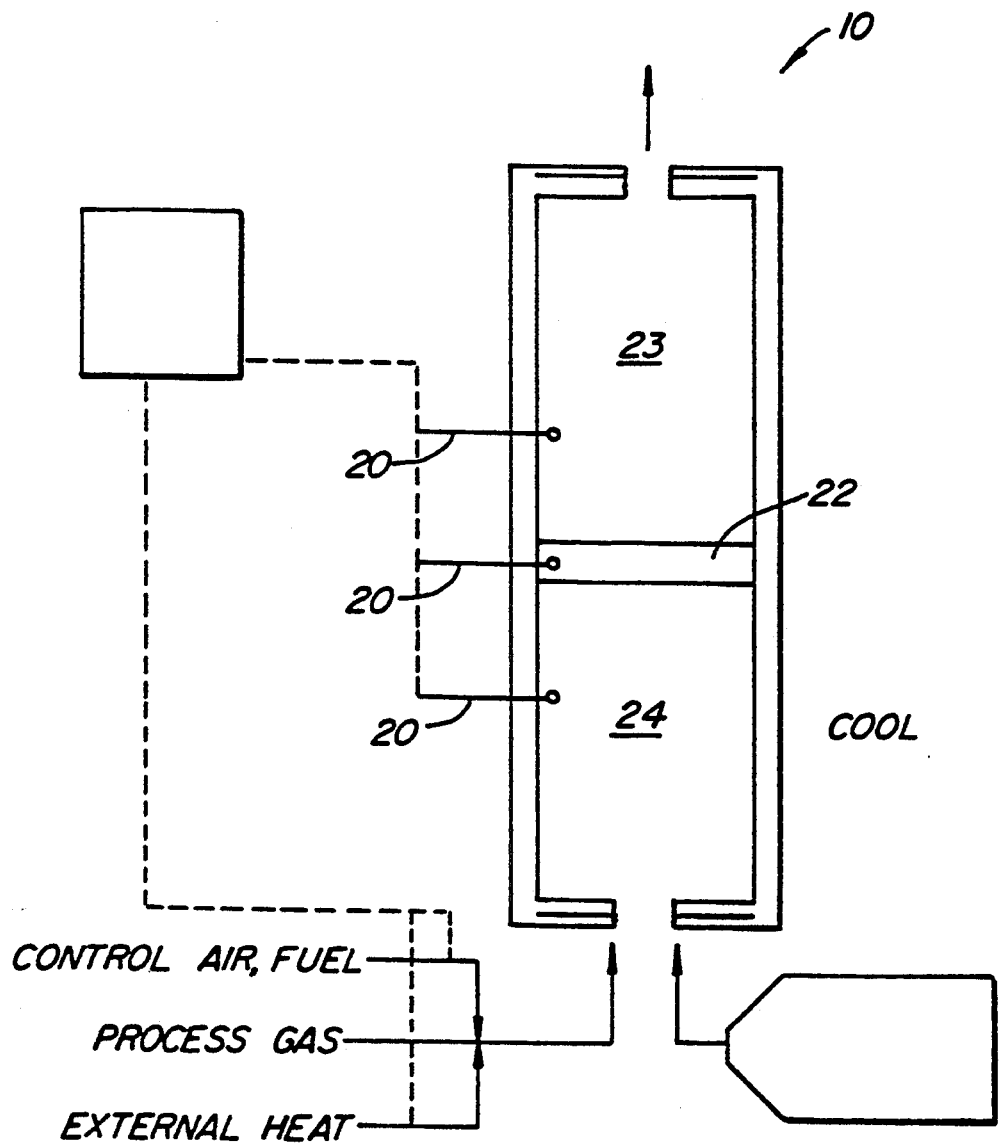
FIG. 6 shows the hot and cool zones in the apparatus of FIG. 5 during operation.

Referring to FIG. 6, there is shown a schematic of the internal temperature zones and combustion wave of the processor shown in FIG. 5. Typically, during operation, there will be a cool zone (24) below the uniform oxidation or combustion temperature that is being maintained within the combustion wave. The combustion wave itself (22) will be maintained in a stable shape and uniform temperature at a location within the matrix; and above the combustion wave (22) will be a hot region (23). By using temperature sensors (20), the combustion wave (22) may be located within the matrix and moved to a desired point and maintained to have a desired height by controlling the input end of the processor (10).

Figure 7:
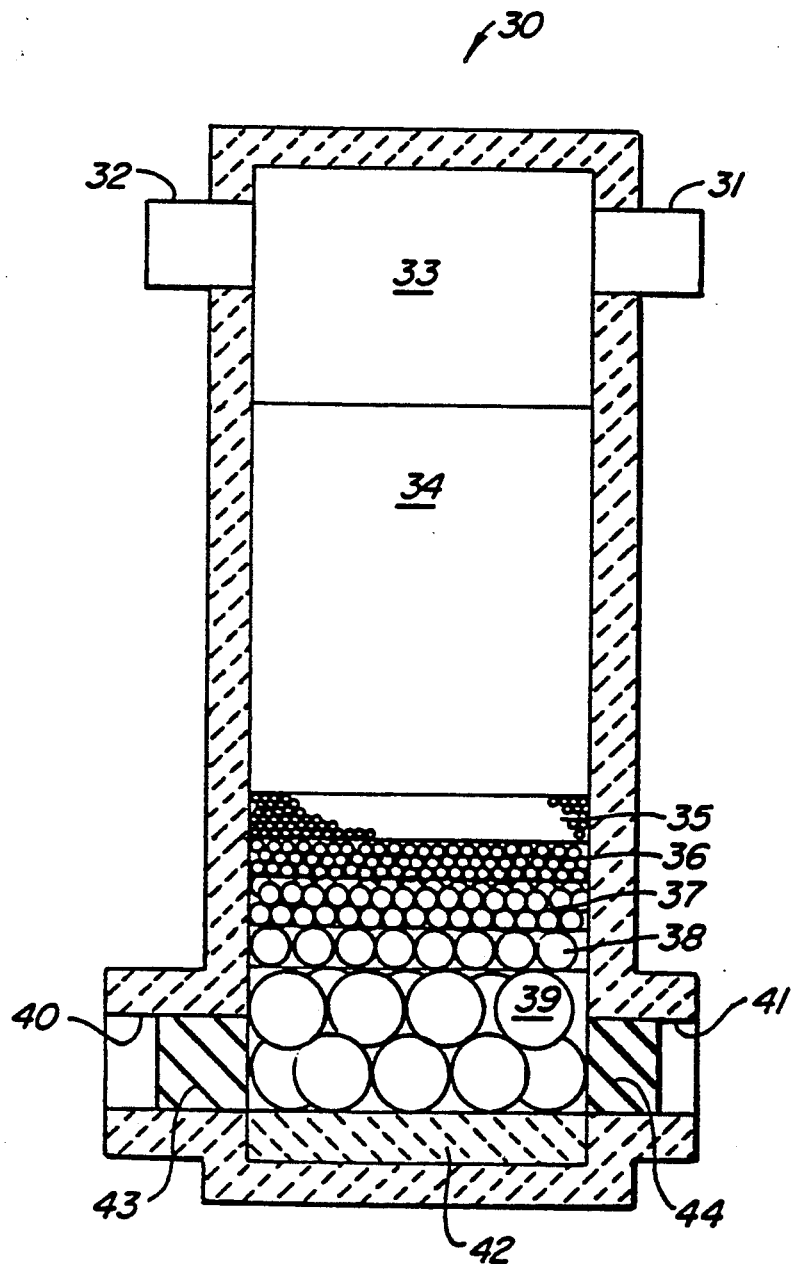
FIG. 7 is a second apparatus for use in accordance with the present invention without using the enhanced recuperative aspect.

Referring to FIG. 7, there is shown another configuration of a processor that may be utilized according to the present invention. The processor (30) comprises an inlet (31) for introducing process gases and air. The item (32) is an inlet for the preburner for preheating the processor similar to that shown in FIG. 5 as (19). The matrix in this instance comprises six different areas. Just below the void (33) there is a stack of ceramic saddles (34) extending through a major portion of the height of the bed. Below the saddles (34) is a series of layers of ceramic balls of increasing size. For example, layer (35) may comprise ⅛ inch (0.32 cm) diameter ceramic balls, layer (36) ⅜ inch (0.95 cm) diameter ceramic balls, layer (37) ¾ inch (1.90 cm) diameter ceramic balls, and layer (38) 1½ inch (3.8 cm) diameter ceramic balls. The bottom layer (39) may comprise, for example, 3 inch (7.62 cm) diameter ceramic balls, that are retained within the processor (30) by porous ceramic plugs (43) and (44). At the bottom of the bed the gases exit through outlet (40) and/or (41), if used. As shown on the bottom of the processor (30), it is insulated by a layer of brick (42).

Figure 8:
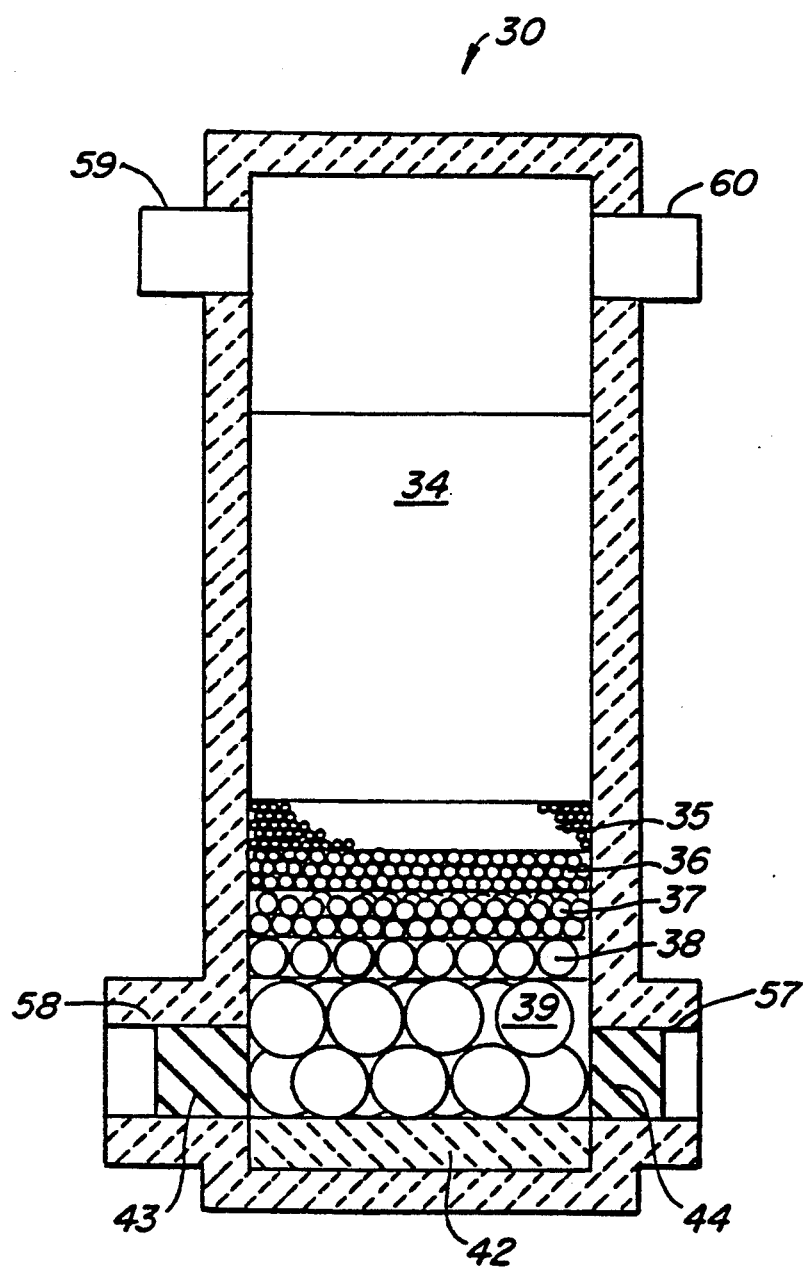
FIG. 8 is yet another apparatus for use in accordance with the present invention without the enhanced recuperative aspect.

Referring to FIG. 8, there is shown a processor (30) having a bed configuration similar to that as shown in FIG. 7. As in FIG. 7, the top area of the bed comprises ceramic saddles (34) preceded by a series of layers of ceramic balls of increasing diameter, layers (35) through (39), respectively. The bottom layer (39) is retained within the processor (30) by porous ceramic plugs (43) and (44). However, in the configuration shown in FIG. 8, the process gas and air are introduced through inlet (57) at the bottom of the processor (30) and the preheated air for preheating the processor (30) is introduced through inlet (58) also located at the bottom of the processor. Therefore, the gases exit at the top of the processor (30) through outlets (59) and/or (60), if used.

Figure 9:
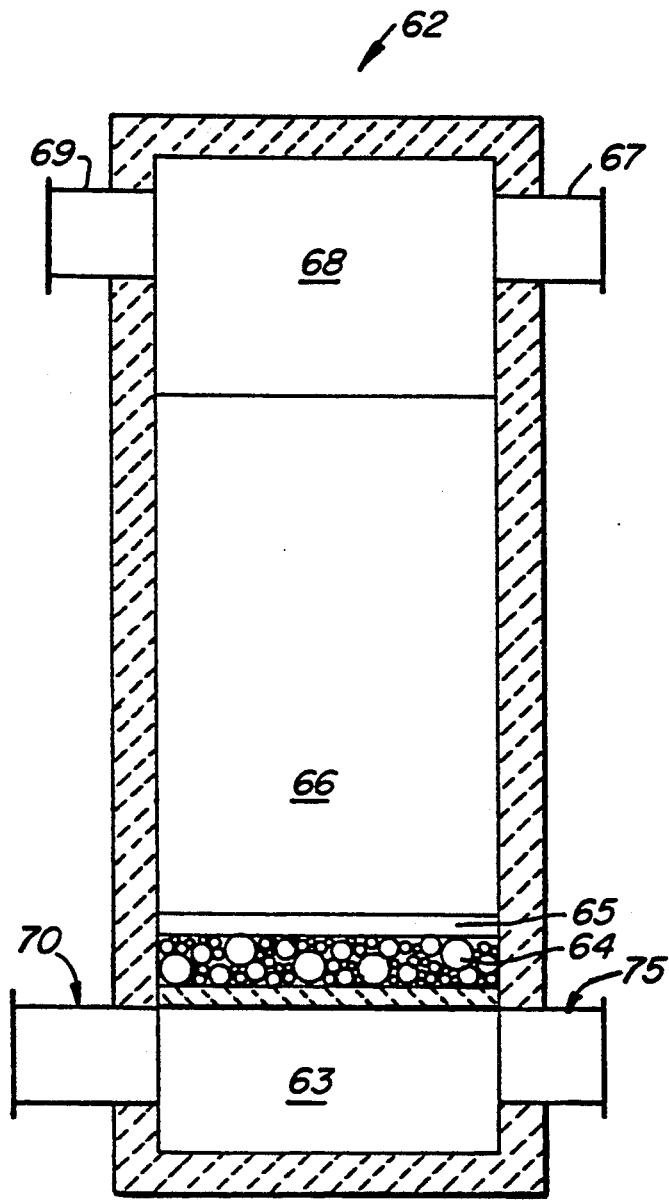
FIG. 9 is another configuration of an apparatus in accordance with the present invention without the enhanced recuperative aspect.

Referring to FIG. 9, there is shown yet another configuration of a processor (62). This processor has a brick plenum (63) through which pass gases that exit outlet (70) or (75), if used. Above the brick layer (63) is a layer of ceramic balls (64) and a second layer (65) of balls of different sizes than those in layer (64). Finally, there is the major portion of the bed comprising saddles or ceramic balls (66). The inlet gases enter through inlet (67) and pass through void (68) before entering into the matrix layer (66). Preheated air for preheating the processor (62) enter through inlet (69).

Figure 10:
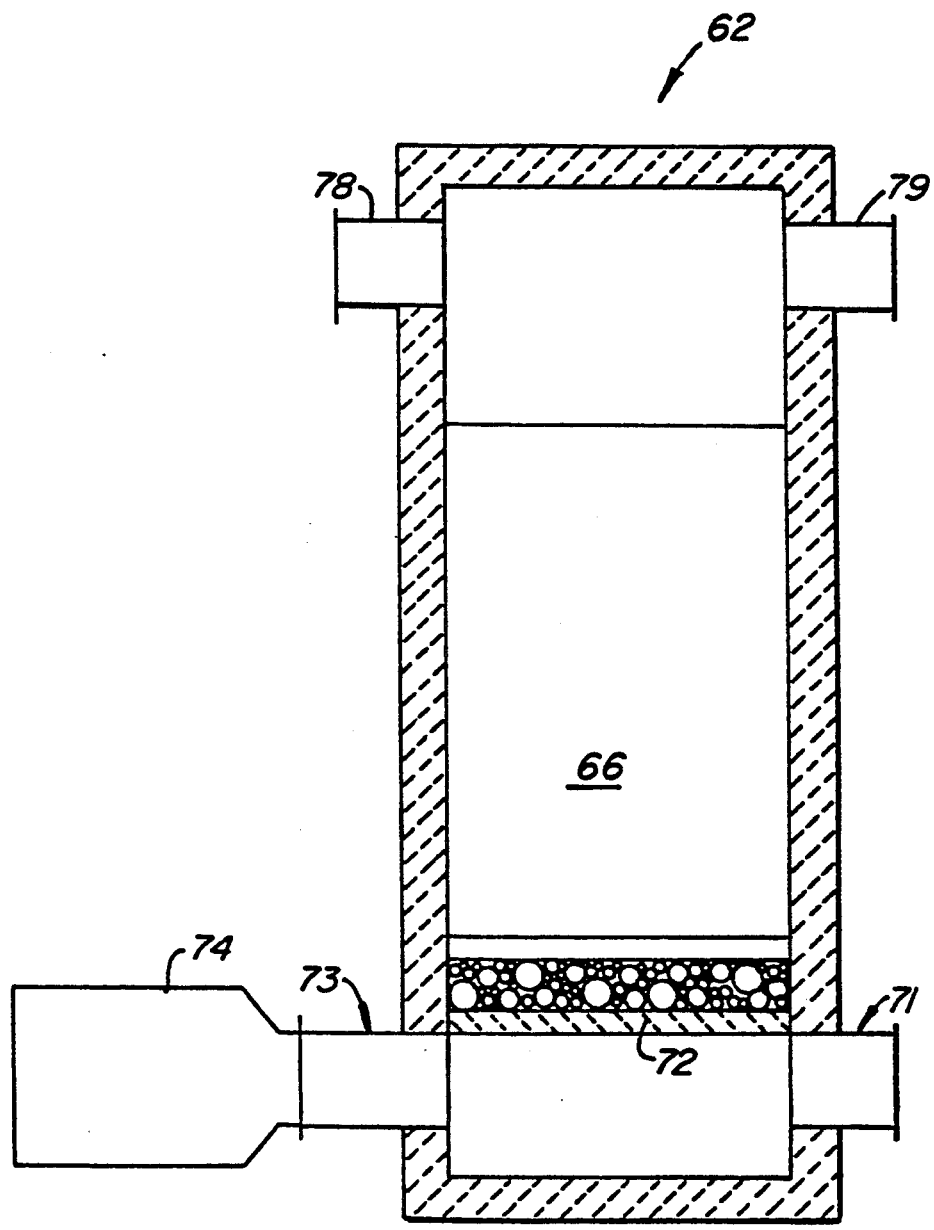
FIG. 10 is a variation of the apparatus of FIG. 9.

Referring to FIG. 10, there is shown the same configuration as shown in FIG. 9 for a processor (62) except that the processing gases pass through the bed in the opposite direction. Accordingly, the process gases and oxygen are introduced through inlets (71) into a plenum lined with brick layer (72). The preheated gases enter through inlet (73) from a preburner (not shown). The preheated air may optionally be formed by combustion in a preburner located on a combustion chamber (74), which combustion chamber serves to more uniformly mix the preheated gases prior to entry into the bed or plenum. The layers of ceramic balls and/or saddles (64), (65), and (66) are as described in connection with FIG. 9. The exit gases exit through outlets (78) and/or (79), if used.

Embodiments Utilizing Enhanced Recuperative Heating

Figure 11:
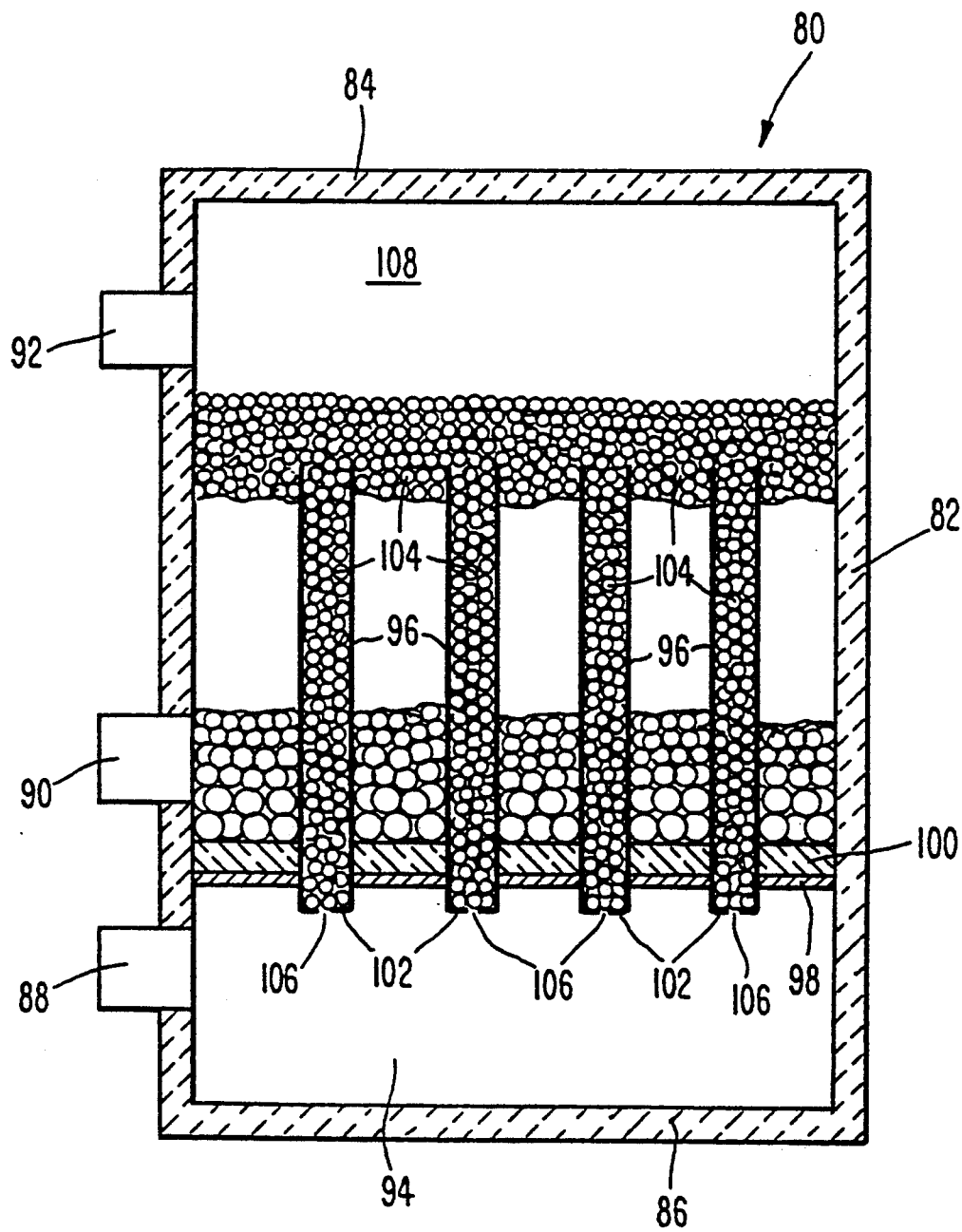
FIG. 11 is a schematic view of a preferred apparatus for use in accordance with the present invention utilizing the enhanced recuperative aspect.

FIG. 11 is a schematic diagram of a cross-section of a processor (80) used for practicing the process according to the present invention utilizing the recuperative aspect of the invention. Walls (82) and roof (84) of the processor (80) are made of an insulating heat-resistant material such as firebrick, castable refractory, insulating fiber modules, or a heat-resistant steel alloy. The processor (80) is encased in steel. The inner surface of the steel may be protected by an appropriate corrosion-resistant material, such as an elastomer or a tar-like coating. A dense castable refractory material also may seal the bottom of the processor (86).

The processor (80) has an inlet port (88), an exhaust port (90), and a heating port (92). The inlet port (88) leads to an inlet plenum (94) at the bottom of the processor (80). A number of feed tubes (96) extend through an impermeable, rigid tubesheet (98) preferably made of steel or metal alloy, and a heat resistant ceramic insulating barrier (100) at the roof of the plenum (94). The tubesheet (98) provides mechanical support for the tubes (96). The lower ends of the feedtubes (96) are provided with caps (102) to retain matrix materials (104) inside the tubes (96). The caps (102) are provided with orifices (106) to permit the flow of gases from the inlet plenum (94) to the tubes (96). The lowermost two or three layers of matrix packing (104) inside the tubes (96) are preferably larger than the remaining matrix layers above, to diminish the possibility that small matrix materials could occlude the orifices (106). In addition, the size and shape of the matrix materials (104) within the tubes (96) may differ from that of the matrix materials (104) in the surrounding matrix bed (105) in order to compensate for certain process conditions, such as comparative pressure drops. The upper ends of the feed tubes (96) may be secured to each other and the walls (82) to provide extra mechanical strength, although this was not found to be necessary in the preferred embodiment.

In a preferred embodiment, the feed tube (96) diameters are in the range of 0.25 to 30 inches (0.64 to 76.2 cm), more preferably in the range of 0.75 to 12 inches (1.9 to 30.5 cm), and most preferably 1.5 to 6 inches (3.8 to 15.2 cm). They are preferably installed in a regularly-spaced manner with the spacing-to-diameter ratio preferably 1 to 10, more preferably 1.5 to 5, and most preferably 2 to 4. The length of the tubes (96) is preferably 1 to 100 times the diameter of the interior of the tubes (96) themselves, more preferably 1 to 10 times the diameter of the interior of the tubes (96), and most preferably 1 to 4 times the diameter of the interior of the tubes (96). The tubes (96) are preferably welded or press-rolled to the tubesheet (98). The thermal conductivity of the tube material is preferably greater than 10 W/m-K, and most preferably greater than 30 W/m-K. In addition to enhancing the heat transfer properties, the preferred tube sizes and spacings also provide for better tube mechanical integrity and less costly welding and attachment operations than typical for a conventional heat exchanger.

The barrier (100) supports a matrix (105) of heat-resistant packing material (104). The matrix material (104) may be comprised of ceramic balls or ceramic foam of varying shapes and sizes as discussed above with respect to FIGS. 5–10. The heat-resistant packing material of the matrix (105) fills the region between the barrier (100) and the void (108) at the top of the processor (80) including the interior of the feed tubes (96). The exhaust port (90) has heat-resistant screens (not shown) to retain the matrix material (104) inside the processor. An outlet plenum, where pressure drop per unit distance traversed by the gas are lower than in the matrix, may be used to enhance the uniformity of distribution of the gases through the matrix. Preferred plenum materials include rigid grids of ceramic or metal alloy, and horizontally- or diagonally-layered packings of increasing or decreasing size.

Figure 14:
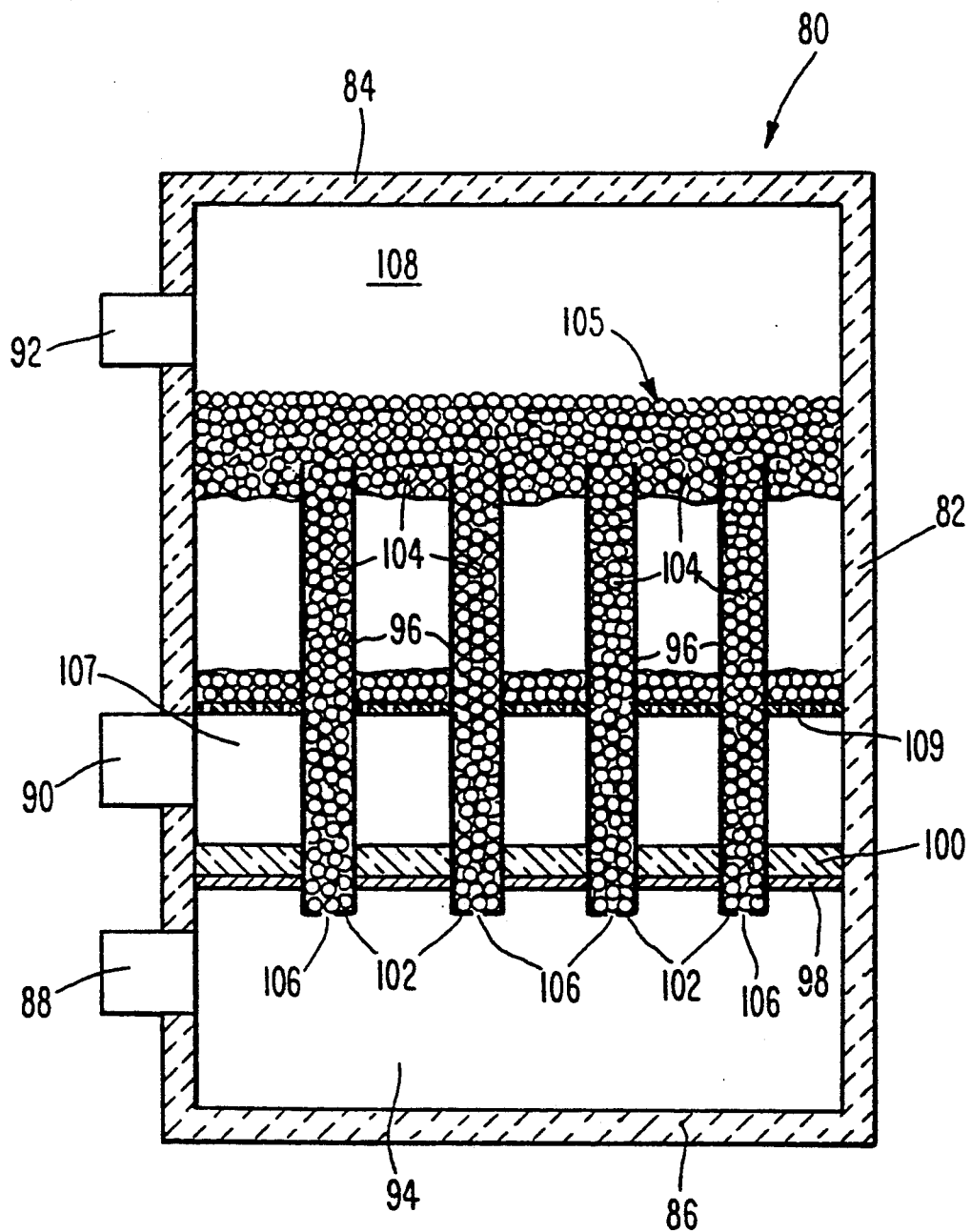
FIG. 14 is a schematic view of a preferred apparatus for use in accordance with the present invention utilizing the enhanced recuperative aspect and illustrating an outlet plenum.

FIG. 14 is identical to FIG. 11 except that it illustrates one embodiment of such an outlet plenum 107 having a grid 109.

The matrix (105) may be heated by forcing heated gases such as air in through the heating port (92), and extracting the heated gases through the exhaust port (90). Alternatively, the matrix (105) may be heated by electric heaters or other means. During preheating, a low flow of ambient air may be bled through the inlet port (88) and up through the heat exchanger/feeding tubes (96) to ensure the tube material is not overheated.

Once the matrix (105) has been heated to a temperature sufficient to combust the process gases, the preheating is terminated, and then the gases are introduced to the processor (80) through the inlet port (88). The apparatus of the present invention will also include means for controlling the flowrate and composition of the process gases (not shown). The process gases may be heated prior to introduction to processor (80) by applying external heat to the gases prior to entering the processor (80) with, for example, an external heat exchanger. Exhaust gases are extracted from the processor (80) through the exhaust port (90).

It is desirable to maintain a well-stirred reaction zone at the upper end of the feed tubes (96). This may be accomplished by measuring the temperature of the matrix (105) in this region and controlling reaction matrix parameters in accordance with the temperature information. For instance, if the temperature declines, supplemental fuel can be added, or supplemental air can be reduced to prevent migration of the combustion zone down along the outside of the tubes (96). If the temperature increases, supplemental fuel can be reduced or supplemental air can be added to prevent the combustion zone from migrating down the inside of the tubes (96).

Typically, during operation, the well-stirred combustion region will be maintained in a stable configuration in the region near the ends of the feed tubes (96). As the exhaust gases flow down past the feed tubes (96) they heat the feed tubes (96) and the matrix (104) by forced convection. Although radiant heating also contributes to heat transfer from the exhaust gases to the matrix (105) and the feed tubes (96), this contribution is generally small compared to the convective heat transfer.

Figure 12:
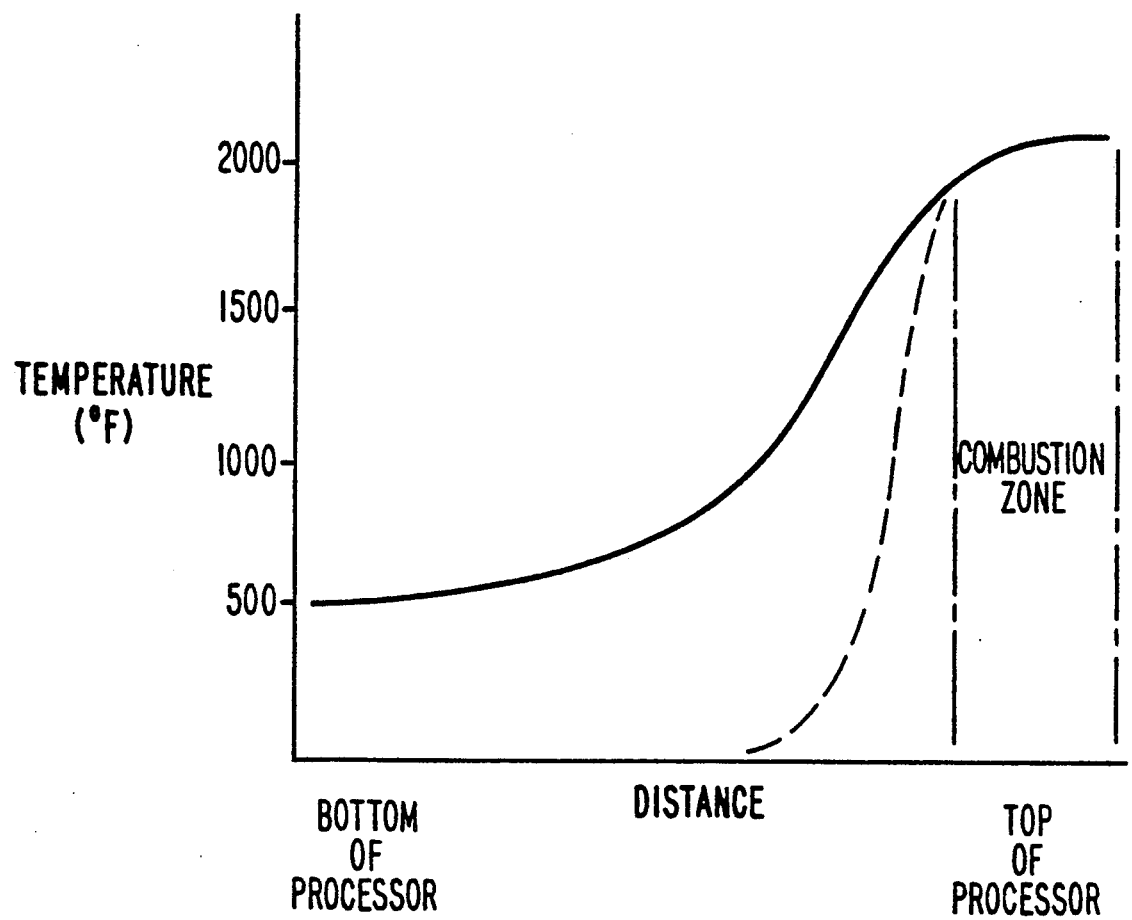
FIG. 12 is a graph comparing the temperature profile of the present invention with that of an embodiment where the exhaust gases are not channeled through the matrix near the feed tubes.

Because the hot exhaust gases flow in the matrix (104) below the combustion region, the matrix (104) has a much less steep temperature gradient than would occur in the absence of the forced convection. The solid curve of FIG. 12 depicts the temperature profile as a function of height for processor (80) of the preferred embodiment. The combustion region near the top of the processor (80) has the highest temperature, in this case approximately 1900° F. (1040° C.). The temperature decreases with decreasing altitude, to reach a value of approximately 500° F. (260° C.) near the bottom of the matrix (105). The heat of the matrix materials (104) is radiantly transferred to the feed tubes (96). The temperature profile of the feed tubes (96) is approximately equal to the temperature profile of the matrix (105), i.e., the radiant coupling between the matrix (105) and the tubes (96) can be considered to be predominantly in directions orthogonal to the longitudinal axes of the tubes (96).

The dot-dash curve of FIG. 12 depicts the temperature profile of a system wherein the exhaust gases are allowed to escape, for instance through the top of the processor (80), without reversing direction and flowing through the matrix (105) external to the tubes (96). Heat transfer through the matrix (105) would in this case be solely due to conduction and intra-matrix surface radiation, and the temperature profile would decay exponentially with distance in the region below the combustion region. Clearly, the recuperative heat transfer to the feed tubes would be substantially decreased. The forced convection of the preferred embodiment contributes to the heating of the feed tubes (96) and the matrix materials (104) in the vicinity of the feed tubes (96).

At high temperatures associated with combustion heat, energy is transferred from the matrix (105) to the feed tubes (96) dominantly by intra-matrix surface radiation, since the surface radiation goes as temperature to the fourth power while conduction and convection energy transfers go as the spatial derivative of temperature and therefore roughly as the first power of temperature. Similarly, the heat transfer from the feed tubes to the interior matrix material (104) is dominated by the thermal radiation mechanism.

Because the process gases are generally "optically thin," heat transfer from the feed tubes (96) and the matrix materials (104) inside the feed tubes (96) to the gas is dominated by convection rather than thermal radiation. The interior matrix materials (104) greatly increase the amount of surface area exposed to the reactant gases, and therefore increase the amount of heat transfer to the reactant gases.

Clearly, the matrix materials (104) surrounding, and interior to, the feed tubes (96) play an important role in the efficient heat transfer from the exhaust gases to the incoming reactant gases. Without the matrix materials (104), radiative and conductive heat-transfer mechanisms would be minimal, and the heat transfer would have to be due to convection.

Figure 13:
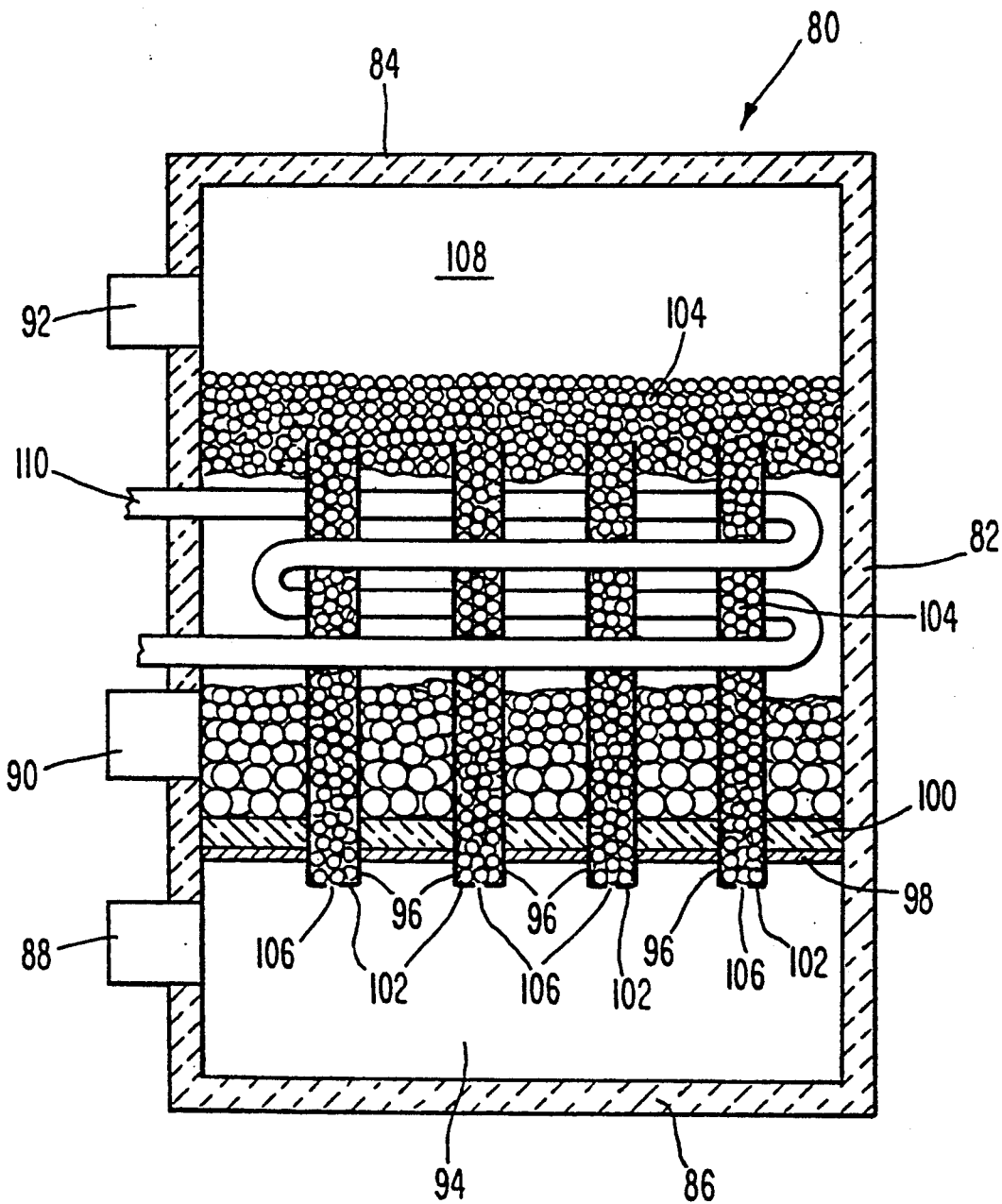
FIG. 13 is a second preferred apparatus wherein the heat generated by the reaction is used to heat a working fluid.

Referring now to FIG. 13, there is shown another configuration of a processor (80) that may be utilized according to the present invention as a boiler. The construction of this embodiment is essentially the same as the processor illustrated in FIG. 11, except for the addition of a boiler tube (110). The boiler tube (110) enters and exits the processor (80) through the side walls (82). In alternative embodiments, the boiler tube (110) may enter and/or exit the processor (80) from the roof (84) or through the barrier (100), the boiler tube (110) may exit the processor (80) on a different side than the side from which it enters, or the boiler tube (110) may be capped so that it has no exit. The boiler tube (110) makes an anfractuous path through the matrix (105) since the amount of heat transfer to the tube (110) increases with the length of the path through the matrix (105). The boiler tube (110) may contain water (for conversion to steam) or another type of working gas or fluid.

The hot exhaust gases from the exothermic reaction of the process gases pass down through the matrix (105) past the feed tubes (96) and the boiler tube (110), and exit through the exhaust port (90). As discussed above, the dominant mechanism for heat transfer from the hot exhaust gases to the feed tubes (96) and the boiler tube (110) is convective heat transfer to the matrix (105) and radiative heat transfer from the matrix (105) to the boiler tube (110) and the feed tubes (96). The boiler tube (110) may contain a working liquid or gas and it may also contain matrix materials (104) in the interior to promote heat transfer.

In summary, apparatus (80) and methods for preheating gases to be introduced to a reaction matrix (105) using an efficient recuperative heat exchange system have been described. It can be seen that this system heats the reactant gases to temperatures approaching the temperature of the well-stirred combustion region. The combustion temperature and residence times in the present combustor are lower than those of a conventional incinerator, thereby providing a high conversion of reactants to products with a minimum of unwanted by-products such as $NO_x$. Efficient heat transfer is obtained by passing the hot exhaust gases through a matrix (105) surrounding the thermally conducting feed tubes (96), and passing the incoming reactant gases through matrix materials (104) interior to the feed tubes (96).

The present invention has been described in terms of several preferred embodiments. However, the invention is not limited to the embodiments depicted and described, but can have many variations within the spirit of the invention. For instance, the feed tubes (96) can be oriented at any angle; the feed tubes (96) need not have parallel orientations; they may be configured as J-tubes, U-tubes, bayonet closed-ended tubes, spiral tubes, or tube sheets; additional tubes carrying working fluids may pass through the matrix (105); the matrix material (104) can have a distribution of characteristic length scales; the characteristic length scale of the matrix material (104) can vary from bottom to top or side to side; the plurality of feed tubes (96) can be replaced with a single, possibly anfractuous, feed tube; the flow through the system may be reversed so that the exhaust gases exit, rather than enter, the system through the feed tubes (96); the flow of reactants to the reaction matrix (105) may be controlled by a microprocessor that monitors temperatures within the matrix (105); the matrix (105) may have heat conducting rods embedded therein to promote heat transfer from the combustion region to the lower parts of the feed tubes (96); the matrix (105) may contain a catalyst for the reaction; or there may be a plurality of exhaust ports.

Accordingly, the scope of the invention should be determined not by the embodiments illustrated, but rather by the appended claims and their legal equivalents. Having thus described the invention, what is desired to be protected by Letters Patent is presented by the following appended claims.

What is claimed is:

1. A method for the exothermic reaction of process gases in a processor comprising the steps of:
   (a) heating a portion of a matrix bed of heat resistant material within the processor above the autoignition temperature of the process gases;
   (b) feeding the process gases into a plenum within the processor;
   (c) directing the process gases from the plenum through one or more feeding tubes, each of the feeding tubes having an inside portion, an entrance end, and an exit end, the one or more feeding tubes extending through a gas impermeable barrier such that the entrance end of the feeding tubes is located within the plenum and the exit end of the feeding tubes is positioned either within the matrix bed or within a void located adjacent to the matrix bed within the processor at a position remote from the gas impermeable barrier;
   (d) directing the process gases from the exit end of the one or more feeding tubes through the matrix bed and to a processor outlet, whereby the process gases are combusted in the matrix bed or in the void within a combustion wave, and whereby the process gases are recuperatively pre-heated in the one or more feeding tubes by the thermal energy produced during the combustion process in the matrix bed; and
   (e) monitoring or otherwise determining the temperature of the matrix bed along the process gas flow-path and controlling the position of the combustion wave within the matrix bed or the void in response thereto.

2. The method of claim 1 wherein the step of controlling the position of the combustion wave is achieved by adjusting the volume of air or oxygen supplied to the matrix bed.

3. The method of claim 1 wherein the step of controlling the position of the combustion wave is achieved by adjusting the volume of supplemental fuel supplied to the matrix bed.

4. The method of claim 3 wherein the volume of supplemental fuel supplied is controlled in an inverse relationship to the temperature of the matrix bed, thereby stabilizing the temperature and location of the combustion wave.

5. The method of claim 1 wherein the step of controlling the position of the combustion wave is achieved by cooling or heating the matrix bed.

6. The method of claim 1 wherein the step of controlling the position of the combustion wave is achieved by adjusting the flowrate of the process gases.

7. The method of claim 6 wherein the flow velocity of the mixture of gases is controlled in an inverse relationship to the temperature of the matrix bed, thereby stabilizing the temperature and location of the combustion wave.

8. The method of claim 1 wherein the combustion wave is controlled at a process gases feed flowrate such that the calculated velocity of the mixture of gases entering the combustion wave, adjusted to conditions of standard temperature and pressure, is greater than the laminar or turbulent flamespeed of that gaseous mixture at the same conditions in absence of the matrix bed.

9. The method of claim 1 wherein the combustion wave is characterized by a heat release per unit volume that is higher than the heat release per unit volume observed in a laminar or turbulent flame of an identical mixture of gases at identical conditions in the absence of the matrix bed.

10. The method of claim 1 wherein the residence time of the process gases in the matrix bed and void necessary to obtain substantially complete combustion is maintained or decreased upon increase of pressure within said matrix bed.

11. The method of claim 1 wherein the inside portion of the feeding tubes contains heat resistant material.

12. The method of claim 1 wherein the combustion wave is characterized by lack of a flame.

13. The method of claim 1 wherein the recuperative pre-heating further utilizes a radiatively-coupled fin, said radiatively-coupled fin being heated by convection by said combusted gases and transferring heat by radiation to said one or more feeding tubes.

14. The method of claim 1 comprising the further step of admixing air, oxygen, supplemental fuel, or both with the process gases prior to feeding the process gases to the matrix bed.

15. The method of claim 1 wherein the composition of the gases entering the matrix bed is outside the explosion or flammability limits of the gases.

16. The method of claim 15 wherein the composition of the gases entering the matrix bed is between 10% and 75% of the lower flammability limit of the gases.

17. The method of claim 1 wherein the length of the combustion wave is from about 2 to about 16 inches.

18. The method of claim 1 wherein the matrix bed temperature is maintained between about 1400° F. and about 3500° F. in the combustion wave.

19. The method of claim 1 wherein the process gases include one or more hydrocarbons selected from the group consisting of simple hydrocarbons, oxygenated hydrocarbons, halogenated compounds, aminated compounds, and sulphur-containing compounds.

20. The method of claim 1 wherein the combusted gases have a $NO_x$ content less than about 40 parts per million by volume and the carbon monoxide content is less than about 50 parts per million by volume, on a dry basis, adjusted to 3% oxygen.

21. The method of claim 1 wherein products of incomplete combustion in the combusted gases comprise less than about 5 ppm of said combusted gases, by volume, dry basis, adjusted to 3% oxygen.

22. The method of claim 1 wherein the gases introduced into the matrix bed have an intermittently varying composition of one or more constituents.

23. The method of claim 1 wherein the gases introduced into the matrix bed have an intermittently varying temperature.

24. The method of claim 1 wherein the gases introduced into the matrix bed have an intermittently varying flowrate.

25. The method of claim 1 comprising the further steps of:
(i) providing a heat exchange tube that passes through the processor and through a portion of the matrix bed; and
(ii) circulating a fluid through the tube, whereby the fluid gains thermal energy upon passing through the tube by heat transfer from the matrix bed.

26. The method of claim 1 wherein the processor outlet is positioned as an outlet from the matrix bed such that the combustion products flow in a countercurrent fashion along an outer portion of the one or more feeding tubes prior to exiting the processor through the processor outlet.

27. The method of claim 1 comprising the further step of mixing the gases prior to introducing the gases into the matrix bed.

28. The method of claim 1 wherein the heat resistant material is chosen from the group consisting of ceramic balls, ceramic saddles, ceramic pall rings, or ceramic rasching rings.

29. The method of claim 1 wherein the heat resistant material is chosen from the group consisting of ceramic foam, ceramic wool, metal foam, or metal wool.

30. The method of claim 28 wherein the matrix bed comprises variously sized heat resistant material.

31. The method of claim 28 Wherein the matrix bed comprises at least two layers of heat resistant material wherein the layers are comprised of differently sized heat resistant material.

32. The method of claim 1 wherein the matrix bed is comprised of a material with a characteristic interstitial length of 1/30 inch to 6 inches.

33. The method of claim 1 wherein the matrix bed has a void fraction from 0.3 to 0.9.

34. The method of claim 1 wherein the material in the matrix bed has a specific surface area from 40 $m^2/m^3$ to 1040 $m^2/m^3$.

35. The method of claim 1 wherein the material in the matrix bed comprises a catalyst.

36. A method for the exothermic combustion of process gases including one or more hydrocarbons in a processor comprising the steps of:
(a) heating a portion of a matrix bed of heat resistant material having a void fraction from 0.3 to 0.9 and a specific surface area from 40 $m^2/m^3$ to 1040 $m^2/m^3$ within the processor above the autoignition temperature of the process gases;
(b) feeding the process gases into a plenum within the processor
(c) directing the process gases from the plenum through one or more feeding tubes containing heat resistant material, each of the feeding tubes having an inside portion, an entrance end, and an exit end, the one or more feeding tubes extending through a gas impermeable barrier such that the entrance end of the feeding tubes is located within the plenum and the exit end of the feeding tubes is positioned within the matrix bed or within a void located adjacent to the matrix bed within the processor at a position remote from the gas impermeable barrier;
(d) directing the process gases from the exit end of the one or more feeding tubes through the matrix bed and to a processor outlet, whereby the process gases are combusted within the matrix bed or the void within a flameless combustion wave, the processor outlet being positioned as an outlet from the matrix bed such that the combustion products flow in a countercurrent fashion along an outer portion of the one or more feeding tubes prior to exiting the processor through the processor outlet thereby recuperatively pre-heating the process gases in the one or more feeding tubes by the thermal energy produced during the combustion process in the matrix bed; and
(e) monitoring the temperature of the matrix bed along the process gas flowpath and controlling the position of the combustion wave in response thereto by adjusting the volume of air, oxygen, or supplemental fuel supplied to the matrix bed, or by adjusting the flowrate of the process gases.

37. An apparatus comprising:
(a) a processor having an inlet for process gases and an outlet for reaction gaseous products;
(b) a portion of the processor including a matrix bed comprising packed heat resistant material connected to the outlet and a void space adjacent to the matrix bed;
(c) a plenum located between the processor inlet and the matrix bed within the processor;
(d) a gas impermeable barrier separating the matrix bed from the plenum;
(e) one or more feeding tubes having an inside portion, an entrance end, and an exit end, the on or more feeding tubes extending through the barrier such that the entrance end of the one or more feeding tubes is located in the plenum and the exit end of the one or more feeding tubes is positioned either within the matrix bed or within the void space;
(f) thermocouples for sensing the temperature of the matrix bed; and
(g) means for adjusting the flow rate of the process gases.

38. The apparatus of claim 37 further comprising:
(i) one or more inlets for control air, oxygen, or supplemental fuel; and
(ii) means for adjusting the flow rate of the control air, oxygen, or supplemental fuel.

39. The apparatus of claim 37 comprising further a control system for accepting input from the thermocouples and, in response thereto, controlling the means for adjusting the flow rate of the process gases.

40. The apparatus of claim 38 comprising further a control system for accepting input from the thermocouples and, in response thereto, controlling the means for adjusting the flow rate of the control air, oxygen, or supplemental fuel.

41. The apparatus of claim 37 wherein the inside portion of the one or more feeding tubes contains heat resistant material.

42. The apparatus of claim 37 wherein the spacing-to-diameter ratio of the feeding tubes is from 1.5 to 5.

43. The apparatus of claim 37 further comprising a preheating means for heating the matrix bed to a temperature above the autoignition temperature of the process gases.

44. The apparatus of claim 37 wherein the outlet is positioned as an outlet from the matrix bed such that the process gases flow in a countercurrent fashion along an outer portion of the one or more feeding tubes prior to exiting the processor through the processor outlet.

45. The apparatus of claim 37 wherein the heat resistant material is chosen from the group consisting of ceramic balls, ceramic saddles, ceramic pall rings, or ceramic raschig rings.

46. The apparatus of claim 37 wherein the heat resistant material is chosen from the group consisting of ceramic foam, ceramic wool, metal foam, or metal wool.

47. The apparatus of claim 45 wherein the matrix bed comprises variously sized heat resistant material.

48. The apparatus of claim 45 wherein the matrix bed comprises at least two layers of heat resistant material wherein the layers are comprised of differently sized heat resistant material.

49. The apparatus of claim 37 further comprising one or more heat exchange tubes extending through the processor and through a portion of the matrix bed.

50. The apparatus of claim 37 wherein the matrix bed is comprised of a material with a characteristic interstitial length of 1/30 inch to 6 inches.

51. The apparatus of claim 37 wherein the matrix bed has a void fraction from 0.3 to 0.9.

52. The apparatus of claim 37 wherein the material in the matrix bed have a specific surface area from 40 $m^2/m^3$ to 1040 $m^2/m^3$.

53. The apparatus of claim 37 wherein the material in the matrix bed comprises a catalyst.

54. The apparatus of claim 37 further comprising an outlet plenum located between the matrix bed and the outlet.

55. The apparatus of claim 37 wherein the matrix bed includes staggered layers of differently sized ceramic balls near the outlet.

56. An apparatus comprising:

(a) a processor having an inlet for process gases and an outlet for reaction gaseous products;
(b) a portion of the processor including a matrix bed comprising packed heat resistant material having a void fraction from 0.3 to 0.9 and a specific surface area from 40 $m^2/m^3$ to 1040 $m^2/m^3$ connected to the outlet and a void space adjacent to the matrix bed;
(c) a plenum located between the processor inlet and the matrix bed within the processor;
(d) a gaseous impermeable barrier separating the matrix bed from the plenum;
(e) one or more feeding tubes having an inside portion, an entrance end, and an exit end, the one or more feeding tubes containing heat resistant material extending through the barrier such that the entrance end of the one or more feeding tubes is located in the plenum and the exit end of the one or more feeding tubes is positioned within the matrix bed or within the void space, wherein the outlet is positioned as an outlet from the matrix bed such that the process gases flow in a countercurrent fashion along an outer portion of the one or more feeding tubes prior to exiting the processor through the outlet;
(f) a preheating means for heating the matrix bed to a temperature above the autoignition temperature of the process gases;
(g) thermocouples for sensing the temperature of the matrix bed;
(h) one or more inlets for control air, oxygen, or supplemental fuel;
(i) means for adjusting the flow rate of the control air, oxygen, or supplemental fuel;
(j) means for adjusting the flow rate of the process gases;
(k) a control system for accepting input from the thermocouples and, in response thereto, controlling the means for adjusting the flow rate of the process gases and the means for adjusting the flow rate of the control air, oxygen, or supplemental fuel.

* * * * *

UNITED STATES PATENT AND TRADEMARK OFFICE
CERTIFICATE OF CORRECTION

PATENT NO. : 5,320,518

DATED : June 14, 1994

INVENTOR(S) : Stilger et al.

It is certified that error appears in the above-identified patent and that said Letters Patent is hereby corrected as shown below:

Column 1, line 4, change "AN" to --A--.

Column 2, line 24, change "thermal-and" to --thermal and--.

Column 3, line 66, change "ma" to --may--.

Column 6, line 64, change "ENGINEER's" to --ENGINEER'S--.

Column 8, line 30, change "t" to --to--.

Column 10, line 1, change "extremey" to --extremely--.

Column 12, line 44, after "of" add --1--.

Column 23, line 40, change "Wherein" to --wherein--.

Column 24, line 40, change "on" to --one--.

Column 26, line 10, change "thematrix" to --the matrix--.

Signed and Sealed this

Twentieth Day of September, 1994

*Attest:*

BRUCE LEHMAN

*Attesting Officer*     *Commissioner of Patents and Trademarks*